United States Patent
Ioannidis

(10) Patent No.: US 8,824,430 B2
(45) Date of Patent: Sep. 2, 2014

(54) WIRELESS MOBILITY GATEWAY

(75) Inventor: Efstathios Ioannidis, Sheffield (GB)

(73) Assignee: Athonet SRL, Trieste (IT)

( * ) Notice: Subject to any disclaimer, the term of this patent is extended or adjusted under 35 U.S.C. 154(b) by 2042 days.

(21) Appl. No.: 11/490,856

(22) Filed: Jul. 21, 2006

(65) Prior Publication Data

US 2007/0091862 A1  Apr. 26, 2007

(51) Int. Cl.
*H04L 12/28* (2006.01)
*H04L 12/50* (2006.01)
*H04L 12/56* (2006.01)
*H04L 29/08* (2006.01)

(52) U.S. Cl.
CPC ............... *H04L 45/00* (2013.01); *H04L 67/14* (2013.01); *H04L 67/141* (2013.01)
USPC ............................ 370/338; 370/401; 370/356

(58) Field of Classification Search
CPC ........ H04L 45/00; H04L 67/14; H04L 67/141
USPC ......... 370/342, 258, 351–358, 395.3, 395.31, 370/389, 392, 396, 328–338, 419, 401, 370/230; 455/403, 445, 433, 455, 455/432.1–446, 428, 422.1, 442, 552.1; 709/238–239, 244, 227–229, 203
See application file for complete search history.

(56) References Cited

U.S. PATENT DOCUMENTS

| | | | |
|---|---|---|---|
| 6,888,807 B2 | 5/2005 | Heller et al. | |
| 7,675,881 B2 * | 3/2010 | Verma et al. | 370/328 |
| 2003/0021256 A1 | 1/2003 | Lee | |
| 2003/0153296 A1 | 8/2003 | Mueller | |
| 2003/0221016 A1 * | 11/2003 | Jouppi et al. | 709/245 |
| 2004/0125770 A1 * | 7/2004 | Pitt et al. | 370/331 |
| 2006/0133298 A1 * | 6/2006 | Ng et al. | 370/254 |
| 2008/0205326 A1 * | 8/2008 | Caradec | 370/328 |

FOREIGN PATENT DOCUMENTS

EP  1 560 378 A2  8/2005

* cited by examiner

*Primary Examiner* — Nizar Sivji
(74) *Attorney, Agent, or Firm* — Volpe and Koenig P.C.

(57) ABSTRACT

A Wireless Mobility Gateway (MOGW) creates a wireless connection to allow a mobile terminal to perform IP packet transmission and reception and make use of mobile data services. The MOGW is able to directly route packets to the Internet and Corporate Networks, thus rendering the whole mobile network more efficient and simpler to construct and manage. The MOGW generates a special tunnel identifier to identify the wireless connection that must be contained in all packets received from the RAN. The MOGW generates such a tunnel identifier by concatenating a number of values that characterize the connection. Therefore, simply by reading this tunnel identifier, the MOGW can more efficiently forward packets appropriately. The Mobility protocol and function between MOGWs allows Mobile terminals to easily move between geographical areas served by different MOGWs.

23 Claims, 20 Drawing Sheets

US 8,824,430 B2

WIRELESS MOBILITY GATEWAY

FIELD OF INVENTION

This invention pertains to the field of telecommunications and particularly wireless mobile internet communications.

DESCRIPTION OF RELATED ART

The Mobile Core Network is part of second and third generation (3G) Mobile Networks. It is widely understood as the network that connects the radio specific portions, otherwise called Radio Access Networks (RANs), to external data networks in particular Internet Protocol (IP) networks such as the Internet and Corporate Networks. Simply speaking, the Core Network processes signalling messages (sometimes called "control messages") received from the RAN and responds appropriately. According to the content of these signalling exchanges, the Core Network begins appropriately forwarding IP packets between the RAN and external IP networks and vice versa. This forwarding is often performed inefficiently, therefore what is needed is a method and apparatus that allows efficient IP packet forwarding from and to all types of mobile terminals and users.

The two main functional entities that perform this forwarding in the conventional Mobile Core Network are Serving GPRS Support Node (SGSN) and the Gateway GPRS Support Node (GGSN). The functionality of these network elements is defined by the mobile standardisation group called the Third Generation Partnership Project (3GPP). The SGSN communicates directly with the RAN, and in particular with the 3G Radio Network Controller (RNC), 3G Base Station Controller (BSC) and 2G BSC, while the GGSN communicates with external IP networks.

An illustration of the IP packet forwarding principles of the conventional mobile core network architecture is shown in FIG. 1.

As the mobile users are connected and move between RNC/BSC 103 and RNC/BSC 104 they will remain "anchored" at the same GGSN 108. This means that all traffic sent from or to a user will have to pass the GGSN, and that normal Internet-like IP routing may only be performed beyond the GGSN that is on the Gi interface 110. This can be very inefficient when the mobile user wants to communicate with a peer (user or a server) which is close to it, while the GGSN is far away from both mobile user and the peer. The same is valid for the case where two mobile users have an ongoing data communication when they are geographically close. In this description we refer to "Mobile", "User Terminal", "User Equipment" or UE interchangeably since they both identify the mobile terminal.

In order for Mobile 100 to communicate with Mobile 101, although they are located in the same geographical area (Location A), all traffic must be sent through the GGSN 108 in Location B as illustrated in 109 traffic "Flow 1". This scenario is typically found today in mobile networks, where Locations A and B may be in different cities or in different parts of large cities. The second flow 107 ("Flow 2") illustrates the communication flow between Mobile 100 and Server 106 (e.g. directory service) both situated in Location A. Once again all traffic must go through the GGSN 108 in Location B and back.

Therefore in essence this architecture disallows optimal data routing. This results in inefficient use of bandwidth resources since, independently of the final destination, a traffic packet may traverse multiple times the national, regional or metropolitan "IP Network" 111 and thus puts extra traffic load on that network. For the same reason this increases the traffic latency, since the traffic path between Mobile 100 and Mobile 101 or Server 106 is longer and non-optimal. This added latency may have an effect on user perception of the quality of the service. It may also be complex to find the correct geographical placement for SGSNs and GGSNs given the effect on the traffic flows. One may decide to always place an SGSN next to a GGSN to optimise traffic flows but that is still costly, inefficient and is not guaranteed to solve the problem. It also defeats the purpose of the architecture. That is why this solution is not feasible and therefore not deployed in most current networks.

Finally in the above architecture the only node that communicates with external peers on an IP network (e.g., Internet) is the GGSN. However, the GGSN according to 3GPP specifications has little or none of the information required to enable advanced services such as location-based services. This makes it difficult to deploy simple and low-cost location-based services over an IP network.

SUMMARY OF THE INVENTION

According to certain embodiments of the present invention, Wireless Mobility Gateway (MOGW) method and apparatus determines whether a wireless connection has been requested by a mobile terminal. As a consequence it performs security functions to authenticate the mobile user and grant access. If requested by the mobile user the MOGW then also creates a wireless connection to allow the MOGW to perform IP packet transmission and reception and therefore make use of mobile data services. The MOGW is able to directly route packets to Internet and Corporate Networks, thus rendering the whole mobile network more efficient and simpler to construct and manage. The MOGW generates a special tunnel identifier to identify the wireless connection that must be contained in all packets received from the RAN. The MOGW generates such a tunnel identifier by concatenating a number of values that characterize the connection. Therefore simply by reading this tunnel identifier the MOGW can more efficiently forward packets appropriately. The Mobility protocol and function between MOGWs allows Mobile terminals to easily move between geographical areas served by different MOGWs.

DETAILED DESCRIPTION OF EMBODIMENTS 1.1 Evolved Core Network Architecture

Figure 1:
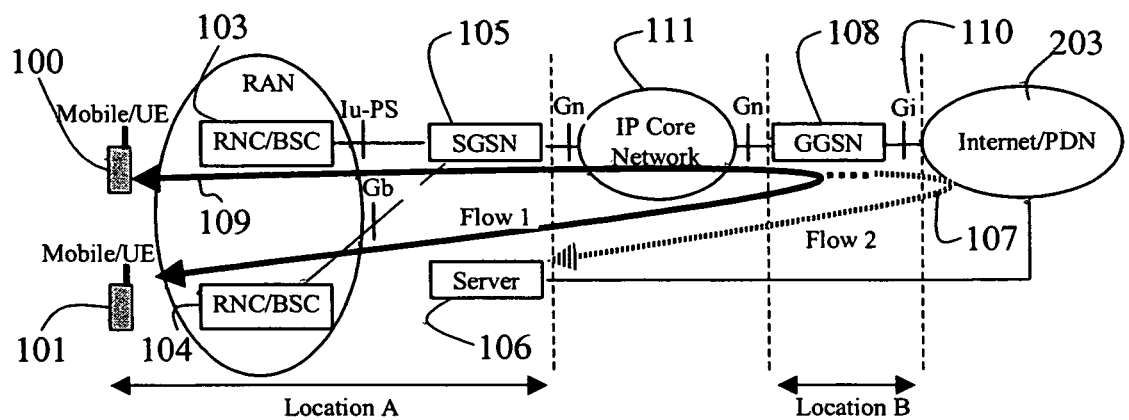
FIG. 1 illustrates the inefficient packet routing in a conventional mobile core network.
Figure 2:
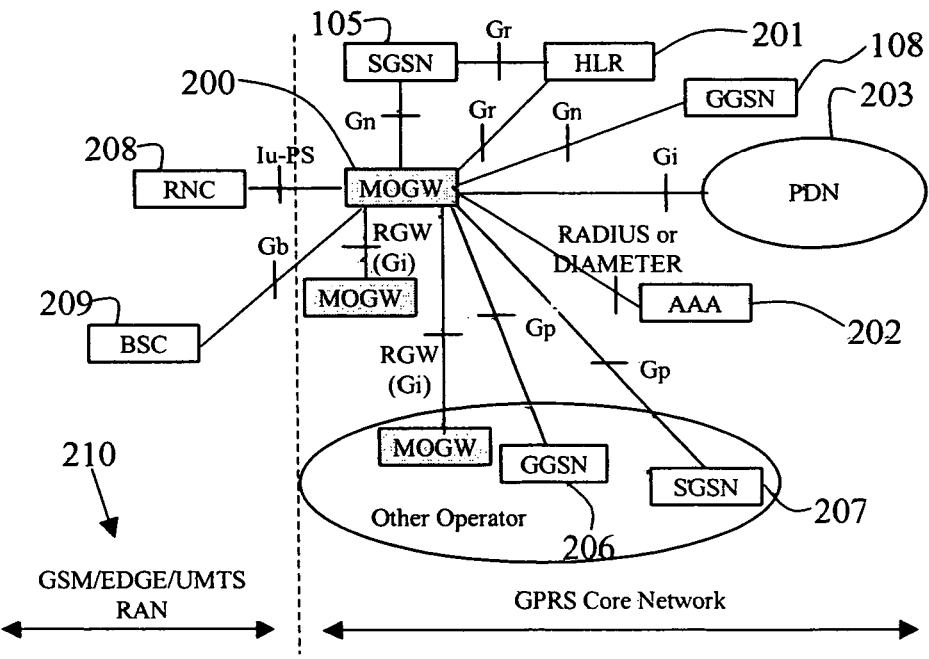
FIG. 2 illustrates the evolved Core Network Architecture using the MOGW in accordance with exemplary embodiments of the present invention.

The evolved network architecture of an embodiment of the present invention is illustrated in FIG. 2. By using a single device to replace SGSN and GGSN, called Wireless Mobility Gateway (MOGW) 200, it is possible to achieve any one or more of the following:

reduce costs (i.e. one product instead of two)

facilitate development of new applications dependent on information which is normally only found deep inside the mobile network (e.g. location-based information)

increase bandwidth efficiency in the mobile packet network decrease end-to-end delay simplify network management and deployment As described herein, a number of complex functions of the SGSN and GGSN are modified and new functions are added in achieving the benefits listed above.

The MOGW 200 will be the main data node in the Core Network and it will enable data communication by users on a GSM/EDGE/UMTS RAN 210 to any IP-based packet data network 203 (e.g., Internet). The GSN/EDGE/UMTS RAN is formed by RNC 208 and BSC 209 devices. The MOGW is also able to interwork with existing Core Network nodes within the same operator's network namely the SGSN 105 and GGSN 108. The MOGW is also able to interwork with existing Core Network nodes outside the mobile network in which the MOGW is located such as SGSN 206 and GGSN 207. It will be able to perform authentication of the mobile user through the HLR (Home Location Register) 201 or the AAA (Authentication, and Accounting) 202 or a combination of both.

1.2 MOGW Node Architecture

Figure 3:
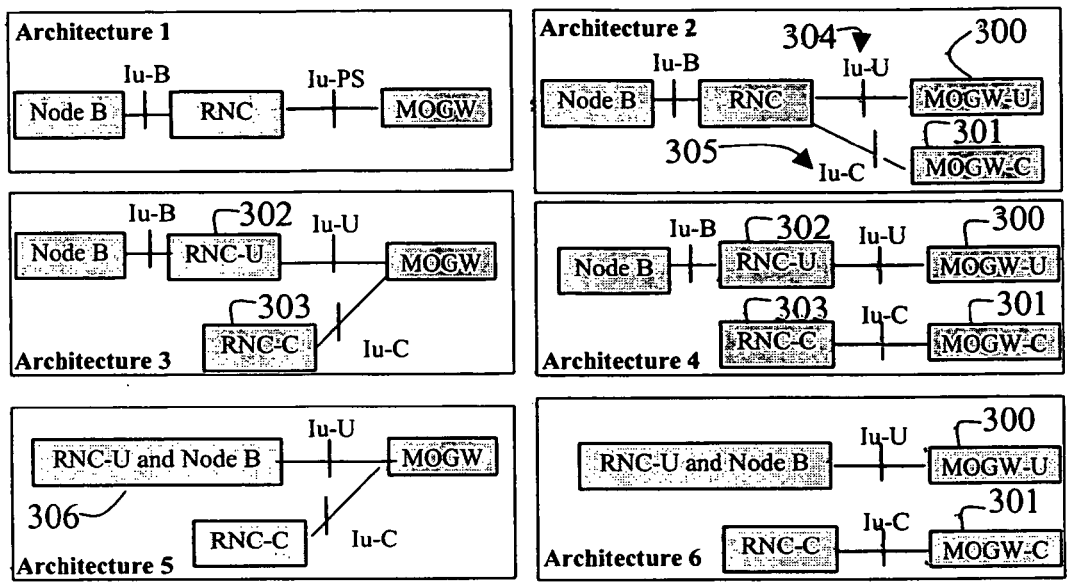
FIG. 3 illustrates the Mobility Gateway (MOGW) architecture scenarios for connectivity towards the Radio Access Network in accordance with exemplary embodiments of the present invention.

Six MOGW Node Architecture scenarios are shown in FIG. 3. The MOGW may be logically divided into two parts: signalling/control part and user traffic part. We will call these respectively MOGW-C 300 and MOGW-U 301. The MOGW-C and MOGW-U may be physically located in the same device or in different physical devices. As shown in the figure the same signalling and user traffic functional division may be applied to the Radio Network Controller (RNC) with which the MOGW is connected. The RNC may be separated into a control RNC-C 303 and a user traffic RNC-U 302 and therefore the Iu-ps interface is also separated into the Iu-U user plane 304 and Iu-C control plane 305 parts. The MOGW is compatible with all configurations involving different locations of the control and user traffic parts. Since the SGSN and GGSN are considered legacy devices, used only for backwards compatibility and connectivity to existing networks, the most important functional subdivision to consider involves the RNC and MOGW. In addition to the logical architectures shown in FIG. 3, it is possible for the RNC-U 302 and MOGW-U 301 parts to be physically combined or separated, and similarly for the RNC-C 303 and MOGW-C 302 parts. Furthermore it is possible for the Node B (otherwise called Radio Base Station) and RNC-U to be combined (306) and connected to the MOGW or MOGW-U as shown in Architecture 5 and 6.

Figure 4:
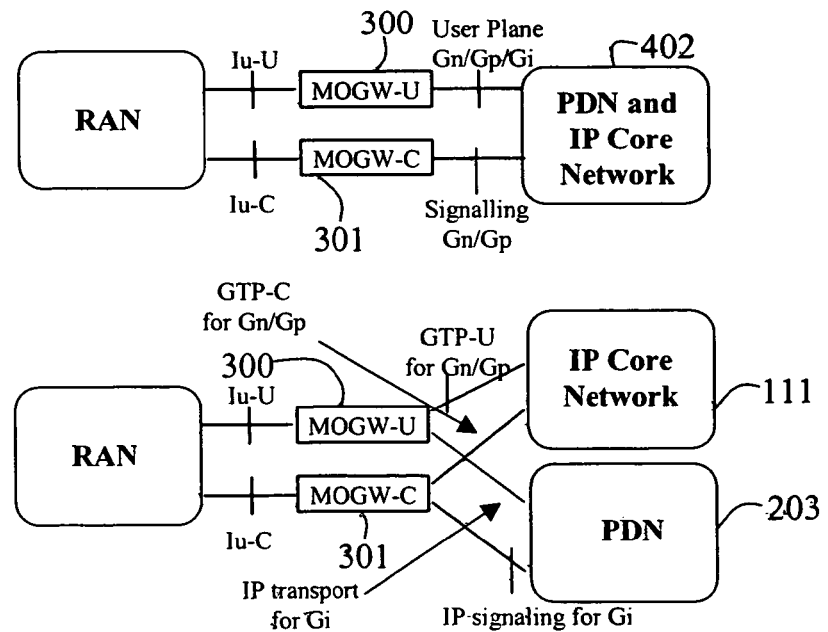
FIG. 4 illustrates the MOGW Logical Architecture Scenarios for connectivity towards the RAN (split MOGW-U/MOGW-c) in accordance with exemplary embodiments of the present invention.

FIG. 4 illustrates the scenarios involving connectivity between MOGW and the Core Network (Gn/Gp) or PDN (Gi). The MOGW-U 400 and MOGW-C 401 may communicate with a combined Core Network and PDN 402 or with a separated Core Network 111 and PDN 203. Although only the scenario involving separate MOGW-U 400 and MOGW-C 401 logical devices is illustrated, the same external interfaces in FIG. 4 can be applied to the case where the MOGW-U and MOGW-C are a combined entity.

1.3 MOGW Functions

The MOGW node architecture is further subdivided into functions, as shown in the functional architecture diagram in FIG. 4, which functions are provided by one or more processors, residing on one or more devices executing computer code, for example, stored in memory or as firmware. It should be further understood that such devices may take any number of forms, including, for example, one or more routers having known components for communicating information, such as network cards, interface cards, network adapters, modems, blades, wireless transmitters, wireless receivers and/or the like.

From the user traffic forwarding viewpoint, the MOGW is represented by the MOGW-U 300 as illustrated in FIG. 4. The MOGW-U is made up of six forwarding direction procedures: Iu-to-Gi (500), Gi-to-Iu (501), Iu-to-Gn (502), Gn-to-Iu (503), Gi-to-Gn (509) and Gn-to-Gi (510). This functionality may be centralized on one or more processors or processor card common to the whole MOGW, or alternatively it may be distributed on physical interface cards (e.g. Ethernet, ATM etc.). For example the Iu-to-Gi functionality may be distributed onto one or more ATM Iu-ps interface cards with network processors. Similarly the Gi-to-Iu functionality may be distributed onto one or more Ethernet Gi interface cards with network processors. The forwarding functionality makes use of forwarding tables that are used to determine the type of processing and forwarding for packets.

Instead in the control plane the MOGW may be represented by the MOGW-C 301 control function. This function handles the signalling procedures and updates the forwarding tables used by the forwarding functions described previously.

The MOGW is capable of communicating with other MOGWs both in terms of control or signalling traffic and user traffic. This communication is performed on the Gi interface and is therefore embedded in the Gi-related forwarding direction procedures illustrated previously.

The MOGW is also capable of containing an Internal Application Server 505. This can be used to run different types of applications used by mobile customers such as directory information and games. Applications used by the mobile network for internal purposes may also be run on the server and this includes location-based services.

User traffic packets and signalling will be received over the external MOGW interfaces namely the Iu-ps 506, Gi 507 and Gn 508. There may be multiple instances of these interfaces on the MOGW as shown in the figure.

1.4 Mobility Gateway Control Plane (MOGW-C) Functionality 1.4.1 Basic Packet-Switched Connection Setup The MOGW implements the basic Iu procedures that allow a mobile terminal to "Attach" and then activate a connection ("PDP Context Activation") with some differences from the 3GPP standards.

The MOGW supports the UMTS GPRS Attach procedure (IMSI Attach or a combined GPRS/IMSI attach) as defined in 3GPP standards. The MOGW also supports authentication procedures as specified in 3GPP standards which will involve communication with other nodes in the network such as the HLR.

Figure 8:
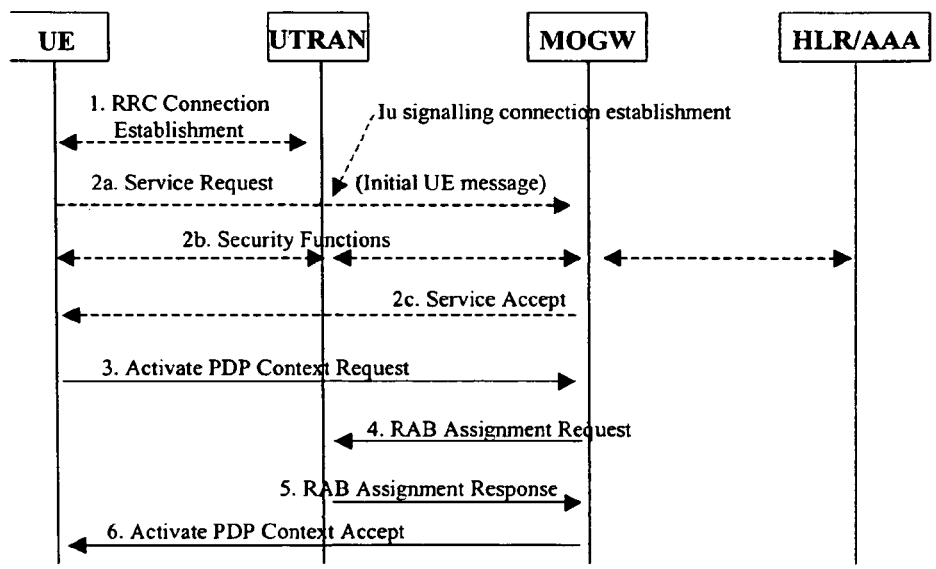
FIG. 8 is a message diagram of the MOGW's PDP Context Activation protocol in accordance with exemplary embodiments of the present invention.

However, an important variation from 3GPP standards is that the MOGW will not need to support the Gn/Gp messages for "Create PDP Context Request" and "Create PDP Context Response" towards and from the GGSN. This is illustrated in FIG. 8. Following a successful PDP Context Activation procedure, the MOGW will receive the appropriate Iu-U traffic packets and will be able to extract the user traffic payload and forward it to its Gi IP interfaces. The forwarding may depend on the Access Point Name (APN) which identifies which service or external network the mobile terminal wants to connect to. This difference is a major advantage of the MOGW approach since it reduces signalling and allows efficient routing of user traffic while remaining compatible with existing GPRS networks.

1.4.1.1 Attach Procedure

Figure 6:
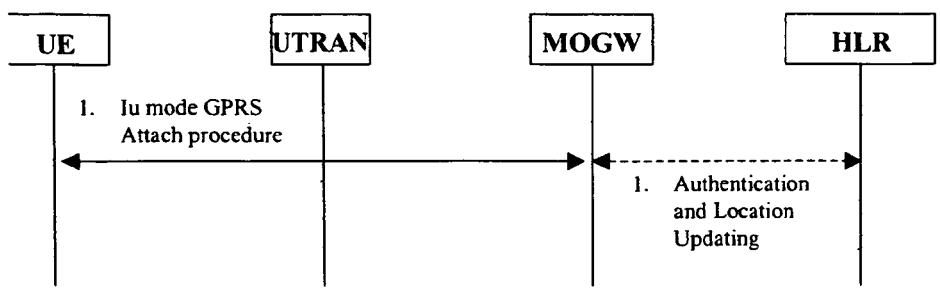
FIG. 6 is a message diagram of the MOGW's Attach procedure with HLR in accordance with exemplary embodiments of the present invention.
Figure 7:
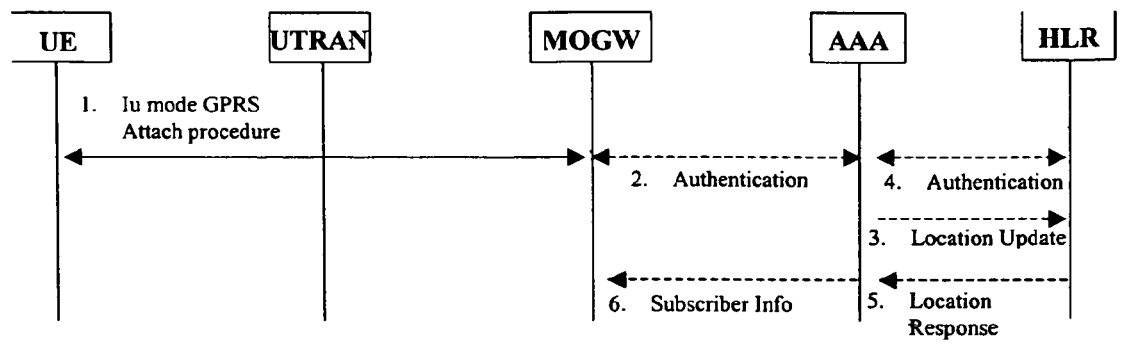
FIG. 7 is a message diagram of the MOGW's Attach procedure with AAA and HLR in accordance with exemplary embodiments of the present invention.

This MOGW performs the basic Attach procedure as illustrated in FIG. 6. An alternative Attach procedure is illustrated in FIG. 7. In the latter case the MOGW does not communicate with the HLR but instead with a AAA (Authentication, Authorisation and Accounting) node. Well known AAA interface protocols are RADIUS and DIAMETER. The AAA interface may in this case be embedded in the HLR server or in a separate AAA server that either replaces the HLR or communicates with an HLR server. After the authentication procedure the AAA server must start the Location Update procedure towards the HLR. It will receive the mobile user's subscription information in reply and must communicate this through the AAA protocol to the MOGW.

1.4.1.2 PDP Context Activation Procedure

This procedure is illustrated in FIG. 8. It is different from that specified in 3GPP standards since the MOGW will not perform signalling towards the GGSN which does not exist in the new architecture.

Following is a description of the numbered message exchanges in FIG. 8:

1) RRC Connection

This message is required only if the terminal (UE) does not have already an active RRC connection. The RRC Connection is needed for the UE to communicate with the RNC and the rest of the network.

2) Service Request/Accept, Security and Iu Signalling Establishment

The UE sends a Service request message to the MOGW if it wants to establish a secure packet-switched connection to it or if it wants to send signalling messages (e.g. Activate PDP Context Request). In the latter case it indicates that it requires a Service Type equal to Signalling while in the former case it is equal to Data. A signalling connection (Iu-PS) is established between RNC and MOGW through Iu-C signalling described previously, if one does not already exist. The MOGW can also initiate security procedures following the Service Request message. If the Service Type was equal to Data, the MOGW will automatically request resource reservation (i.e. RABs) for any of the UE's PDP Contexts which are still in active state in the MOGW. The Service Accept message is then used to inform the UE that this procedure has been completed.

3) Activate PDP Context Request

Upon receiving an Activate PDP Context Request message or an Activate Secondary PDP Context Request message, the MOGW parses the message, performs eventual checks and establishes the PDP Context. For the first PDP Context established by a user within each APN, this procedure must include the configuration of an IPv4/IPv6 network address to be assigned to the UE. The MOGW will assign an IPv4 address or IPv6 address prefix appropriate for the requested APN. It will also create a new entry in the Gi forwarding table and Iu-to-Gi forwarding table, which will be used in providing the Gi forwarding function described in 1.10 and 1.11. A secondary PDP context reuses the parameters from the first (sometimes called Primary) PDP Context including the PDP (IPv4 or IPv6) address but excluding the QoS parameters.

4) RAB Assignment Request

This message contains a request to establish a radio channel with certain the RAB parameters relative to the PDP Context requested by the UE. The MOGW generates a GTP Tunnel Endpoint Identifier (TEID) value to assign to this connection on the Iu according to the procedure described in section 1.6.

5) RAB Assignment Response

This is the response to the RAB Assignment Request that identifies whether the radio channels were established or not.

6) Activate PDP Context Response

After Step 3 has been completed, the MOGW will issue this Response message to the UE. Once Step 6 is complete, the MOGW is prepared to receive and appropriately forward packets destined to the IP address of the mobile terminal and, in the reverse direction, forward IP packets sent by the mobile terminal. The forwarding algorithms are described in sections 1.10, 1.11, 1.12 and 1.13.

1.5 Access Point Names

The MOGW will allow configuration of Access Point Names (APNs) as defined by 3GPP specifications. These are used to separate packets being transmitted and received on the Gi interface. An APN is in a sense a logical subdivision (sub-interface) of the Gi interface which is identified by a name. An example is the APN "mobileapn.companyx.com" to identify the corporate connectivity service to Company x, or "wap.operator.com" to identify the wap service. The mobile terminal will activate a PDP Context (data connection) in which it will specify an APN to identify the service it wants to connect to.

The MOGW configures an address range (hereafter called address pool) on every APN to be used to assign IP addresses to UEs. The mobile terminal may receive a different address possibly through a different addressing mechanism depending on the APN it connects to. The MOGW can perform separate IP forwarding on different APNs. This means that logically a separate IP routing table exists for every APN coupled to some form of physical traffic separation such as IEEE 802.1q VLAN or MPLS.

Since the APN identifies services or corporates, the same APN may exist on multiple MOGWs. Therefore address prefixes for each APN need to be efficiently distributed between MOGWs. The method to achieve this is described in section 1.14.

Furthermore the APNs and relative address prefixes must be assigned to one or more physical Gi interfaces (e.g. Ethernet) or logical Gi interfaces (e.g. IPsec) on the MOGW device. In particular in FIG. 4 the APN called "internet.operator.net" may be configured on both interfaces Gi-1 and Gi-2. If the APN had a certain amount Z of addresses assigned to it, the MOGW is able to automatically assign a portion of those addresses to interface Gi-1 and a portion to Gi-2. Such a portion of addresses may be any percentage of Z.

1.6 GTP Tunnel Endpoint Identifier (TEID) Generation

The GTP header contains the GTP Tunnel ID (TEID). When connections are established for mobile users, a specially formatted TEID value is assigned to each by the MOGW. For example, the MOGW sets the value of the TEID to be used when GTP packets are sent from the radio network to the MOGW.

The MOGW uses a special format and the following values to construct the TEID:

Physical Interface Index: a value which identifies the Gi physical interface (e.g. interface card). This value preferably ranges Logical Interface Index: a value which identifies the logical interface (e.g. tunnel interface related to a certain APN)

Connection Identifier: a value which identifies the specific user's connection, for a given Logical Interface index. The Logical interface together with the Connection identifier uniquely identify the user connection that a packet belongs to when it is received at an Iu or Gn interface. Logical Interface Index and connection identifier can also be used together to obtain the IP address assigned to the UE.

Format Type flag (T flag): identifies the type of TEID structure which determines the location and structure of the values contained in the TEID Forwarding flag (F flag): used by the Iu portion of the Iu-to-Gi and Iu-to-Gn forwarding functions to determine whether the packet should be destined to the Gi or Gn interfaces. When it is equal to zero it identifies the destination as a Gi interface and when it is equal to one it identifies the destination as a Gn interface. The forwarding flag may also be used by the Gn portion of the Gn-to-Iu and Gn-to-Gi forwarding functions to determine whether the packet should be destined to the Iu or Gi interfaces. When it is equal to zero it identifies the destination as a Gi interface and when it is equal to one it identifies the destination as a In interface.

Security flag (S flag): a flag used to determine whether special security processing should be given to the packets carrying the flag. When the flag is set to 1 it identifies the need to perform legal intercept functions on the packet and therefore to copy the packet and forward it appropriately.

Quality of Service (QoS) Identifier: If QoS processing is required then the QoS identifier can be used together with the above values in order to construct the GTP TEID. The QoS identifier determines the QoS characteristics of that packet.

The MOGW can obtain the above values by inspecting the GTP TEID that is contained in received packets and it can use these values to perform high-speed processing and forwarding of these packets without requiring the forwarding functions to perform complex table lookups.

Figure 5:
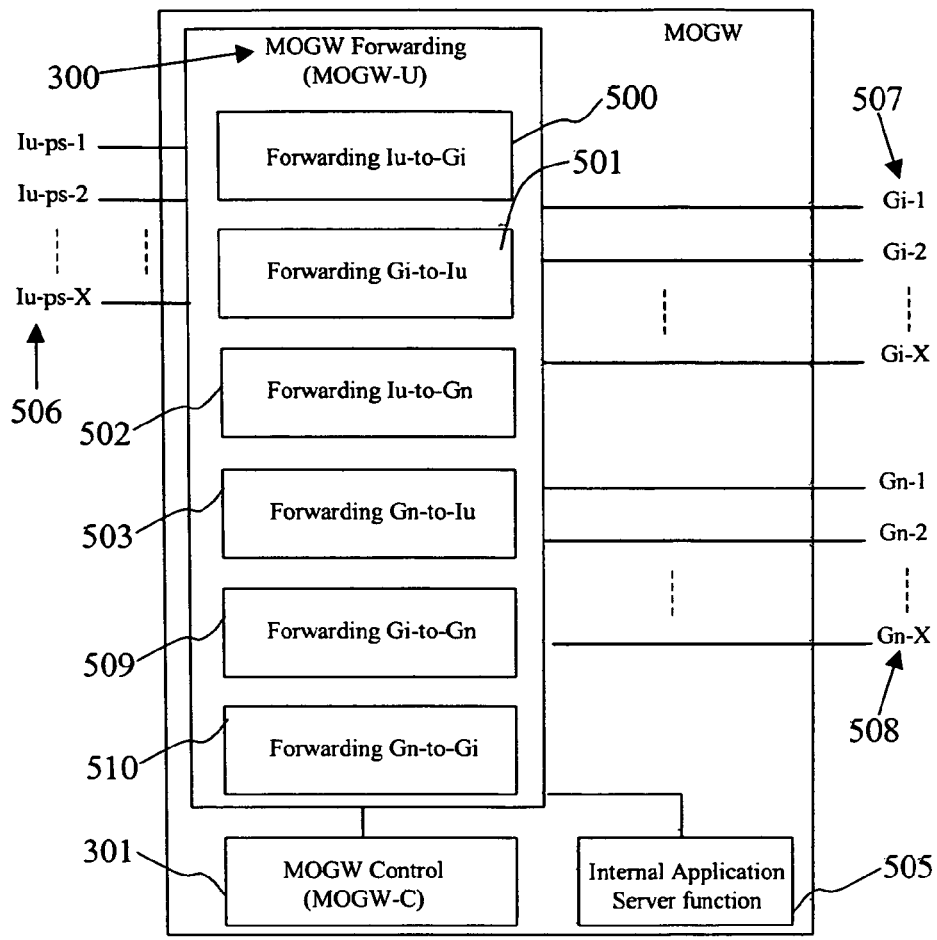
FIG. 5 is a schematic of the MOGW Functional Architecture in accordance with exemplary embodiments of the present invention.

In particular such an internal structure of the GTP TEID allows the implementation of an intelligent fast forwarding mode in the Iu-to-Gi forwarding function (500 in FIG. 5). It is enough for the Iu-to-Gi forwarding function to inspect the combined Physical and Logical Interface Indexes to be able to process the packet and forward it to the appropriate outgoing interface. Without this special format the forwarding decision would require a costly lookup on a forwarding table which slows down the performance and requires large memory to store the forwarding table.

The GTP internal structure can be used by the MOGW for internal scheduling purposes, so as to give higher priority to a certain APN's traffic over other traffic.

It is also possible to obtain the IP address or address prefix assigned to the UE simply by combining the Logical Interface Identifier and Connection Identifier. This would require the IP address or address prefix to be chosen together with the GTP TEID. Such an easy method to determine the mobile user's IP address from the GTP TEID contents allows a fast ingress filtering check to be performed on all packets incoming from the Iu interface. If ingress filtering is enabled, the source address or address prefix of the IP packet encapsulated in the GTP header is checked against the IP address or address prefix obtained from the GTP TEID. If they match then the packet is forwarded appropriately, otherwise the packet is discarded.

The exact TEID structure can be generated automatically by the MOGW. The MOGW must be configured with the APNs, the expected number of mobile users per APN and the corresponding physical interfaces. Using these parameters the MOGW can generate the GTP TEID structure that will be used to construct the TEIDs.

The size in bits of each of the parameters described above that form the GTP TEID can vary from zero bits to the whole size of the GTP TEID (in this case 32 bits). The GTP TEID is taken to be 32 bits long although it is possible to apply the same method to TEIDs of greater or smaller bit sizes. Examples of the internal TEID structure in accordance with the present invention are given in the following sections.

1.6.1 GTP Tunnel Endpoint Identifier (TEID) Format Type 1

Figure 9:
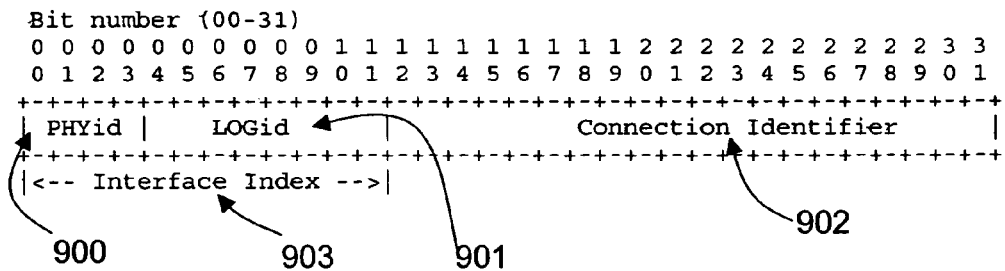
FIG. 9 illustrates a GTP TEID Format (Type 1) in accordance with exemplary embodiments of the present invention.

A first example of the TEID structure in accordance to this invention is illustrated in FIG. 9. We call this Format Type 1. The TEID is 32 bits long and the bits are numbered from left to right in the figure. Three values are used to generate the TEID, namely the Physical Interface Index 900 (PHYid), Logical Interface Index 901 (LOGid) and the Connection Identifier 902. The concatenation of the Physical Interface Index 900 and the Logical Interface Index 901 forms the Interface Index 903. A description of the bit-wise location and bit size of these values is given below:

Bits 00-02 Physical Interface Index (3 bits). This allows a maximum of 8 physical Gi interfaces.

Bits 03-10 Logical Interface Index (8 bits). This allows 254 logical interfaces per physical interface.

Bits 11-31 Connection Identifier (21 bits). This allows 2097152 mobile user connections for each combination of physical and logical interface.

1.6.2 GTP Tunnel Endpoint Identifier (TEID) Format Type 2

Figure 10:
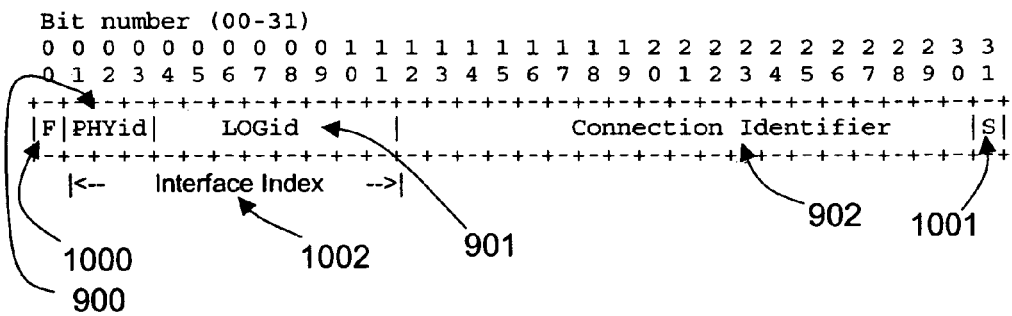
FIG. 10 illustrates a GTP TEID Format (Type 2) in accordance with exemplary embodiments of the present invention.

A second example of the TEID structure in accordance to this invention is illustrated in FIG. 10. We call this Format Type 2. The TEID is 32 bits long and the bits are numbered from left to right in the figure. Five values are used to generate the TEID, namely the Forwarding flag 1000 (F), the Physical Interface Index 900 (PHYid), the Logical Interface Index 901 (LOGid), the Connection Identifier 902 and the Security Flag 1001 (S). The concatenation of the Physical Interface Index 900 and the Logical Interface Index 901 forms the Interface Index 1002. A description of the bit-wise location and bit size of these values is given below:

Bit 00 Forwarding Flag. The flag is used by the Iu forwarding function to determine the packet should be destined to the Gi, Gn or Iu interfaces.

Bits 01-03 Physical Interface Index (3 bits). This allows a maximum of 8 physical Gi, 8 physical Gn and 8 physical Iu interfaces.

Bits 04-11 Logical Interface Index (8 bits). This allows 254 logical interfaces per physical interface.

Bits 12-30 Connection Identifier (19 bits). This allows 524288 mobile user connections for each combination of physical and logical interface.

Bit 31 S flag (security flag). Used to identify the need to perform special legal intercept functions on the packet.

1.6.3 GTP TEID Format Type 3

Figure 11:
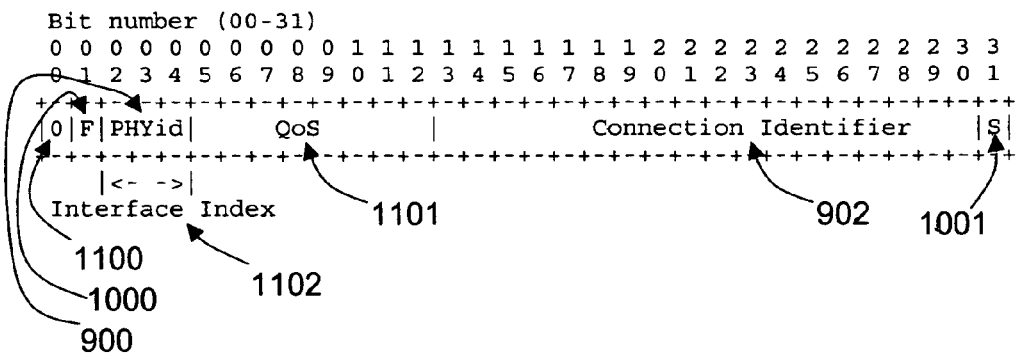
FIG. 11 illustrates a GTP TEID Format (Type 3) when the Format Type flag is equal to zero in accordance with exemplary embodiments of the present invention.

A third example of the TEID structure in accordance to this invention is illustrated in FIG. 11. We call this Format Type 3. The TEID is 32 bits long and the bits are numbered from left to right in the figure. Five values are used to generate the TEID, namely the Format Type flag set to zero 1100 (T), the Forwarding flag 1000 (F), the Physical Interface Index 900 (PHYid), the Quality of Service identifier 1101 (QoS), the Connection Identifier 902 and the Security Flag 1001 (S). The concatenation of the Physical Interface Index 900 and the Logical Interface Index 901 forms the Interface Index 1102. A description of the bit-wise location and bit size of these values is given below:

Bit 00 Format Type Flag (T). Determines the format of the TEID structure. In this case it is equal to zero (1100) and always identifies the default APN, therefore no logical index is required.

Bit 01 Forwarding Flag. This is used by the Iu forwarding function to determine whether the packet should be destined to the Gi or Gn interfaces. When it is equal to zero it identifies the destination as a Gi interface and when it is equal to one it identifies the destination as a Gn interface.

Bits 02-04 Physical Interface Index (3 bits). This allows a maximum of 8 Gi (if "F" flag is zero) or Gn (if "F" flag is one) interfaces.

Bits 05-12 Quality of Service (8 bits). This corresponds to the Internet Protocol's Diffserv Code Point (DSCP) field. This field may be reduced down to one bit depending on the number of QoS levels required.

Bits 13-30 Connection Identifier (18 bits). This allows 262144 mobile user connections for each combination of physical and logical interface.

Bit 31 S flag security flag. Used to identify the need to perform special legal intercept functions on the packet.

Figure 12:
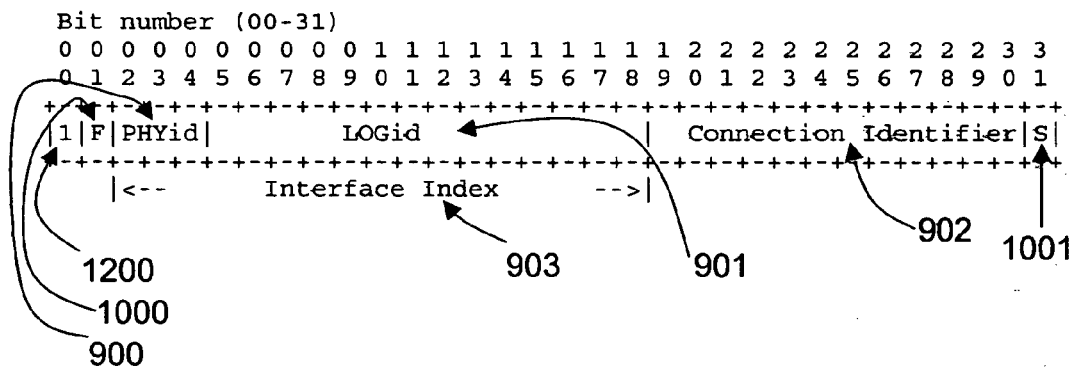
FIG. 12 illustrates a GTP TEID Format (Type 3) when the Format Type flag is equal to zero in accordance with exemplary embodiments of the present invention.

When the Format Type flag (T) is set to one the format of the TEID structure is different as shown in FIG. 12. A description of the bit-wise location and bit size of these values is given below:

Bit 00 Determines the format of the TEID structure. In this case it is equal to one (1200) and is used for special APNs, therefore a logical index is required to identify the specific APN. It is assumed in this case that the QoS is implicitly the same for all mobile users on the same APN (e.g. corporate users belonging to the same corporate).

Bit 01 Forwarding Flag. This is used by the Iu forwarding function to determine whether the packet should be destined to the Gi or Gn interfaces. When it is equal to zero it identifies the destination as a Gi interface and when it is equal to one it identifies the destination as a Gn interface. This flag is always set to zero and ignored in the Gi-to-Iu direction.

Bits 02-04 Physical Interface Index (3 bits). This allows a maximum of 8 Gi (if "F" flag is zero) or Gn (if "F" flag is one) interfaces.

Bits 05-18 Logical Interface Index (14 bits). This allows 16384 logical interfaces per physical interface.

Bits 19-31 Connection Identifier (12 bits). This allows 4096 mobile user connections for each combination of physical and logical interface.

Bit 31 S flag security flag. Used to identify the need to perform special legal intercept functions on the packet.

1.7 IPv4 Address and IPv6 Address Prefix Representation in the MOGW

Figure 13:
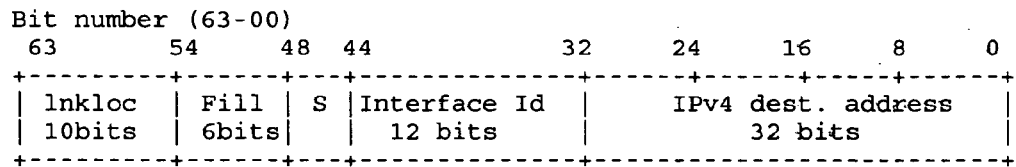
FIG. 13 illustrates the 64-bit PDP Address format when created from an IPv4 address in accordance with exemplary embodiments of the present invention.

The IP address assigned by the MOGW to the UE is referred to as PDP Address, here abbreviated as PDP_addr. It is stored in the forwarding tables using a special format that allows the use of the same 64-bit PDP Address field in the tables for both IPv4 and IPv6 addresses. The PDP_addr field is a 64-bit field. Since IPv6 address prefixes are 64-bit long there is a direct match between PDP_addr and IPv6 prefix. However IPv4 addresses are 32-bit long. FIG. 13 describes the PDP_addr format when it contains IPv4 addresses. This format is used to convert IPv4 address to PDP_addr format and vice versa.

Bits 64-54 Lnkloc (10 bits): 1111111010. This is the same as the IPv6 link-local prefix pattern.

Bits 54-48Fill (6 bits): 111111

Bits 48-44S. Spare bits (4 bits) set to 0000. When the GTP TEID is of Format Type 3 and the Format Type flag (T) is equal to 1 then S is equal to the 4 highest order bits of the TEID's Interface Index.

Bits 44-32 Interface Id. The Interface index (12 bits) contained in the GTP TEID. In case of GTP TEID Format Type 3, when the Format Type flag (T) is equal to 0 (see FIG. 11) then the Interface index is also set to 0. Instead if the GTP TEID is according to Format Type 3 but the Format Type Flag (T) is equal to 1 (see FIG. 12) then the Interface index is equal to the lowest 12 bits of the TEID's Interface index.

Bits 32-0 IPv4 destination address. This is the IPv4 address assigned by the MOGW to the UE or mobile terminal or wireless connection upon PDP Context activation.

Although the foregoing description involves a PDP address length of 64 bits it should be understood that a 128-bit PDP address can easily be implemented. For IPv6 the 128-bit PDP Address would include the whole IPv6 address if a single address is assigned to the mobile user. If a /64 prefix is assigned to the mobile user then the PDP Address is composed of the /64 prefix and the link-local interface identifier assigned during PDP Context activation. For IPv4 the 128-bit address would be the concatenation of the 64-bit format described previously and a dummy 64-bit value.

1.8 Forwarding Tables

The MOGW contains and uses eight Forwarding tables to perform the forwarding processes. The forwarding tables are: Gi forwarding table, APN forwarding table, Gn forwarding table, Iu-to-Gi forwarding table, Iu-to-Gn forwarding table, Router Advertisement (RA) forwarding table, Inter-MOGW Connection Mapping (COMA) table and Inter-MOGW Source IP address Mapping (SIPMA) table. Every entry in the tables is composed by different fields such as incoming TEID (TEID_in), outgoing TEID (TEID_out), PDP address assigned to UE (PDP_addr) and other fields described herein.

Each one of the Forwarding tables is stored and provided in one of the following ways within the MOGW:

1. Centralized storage location
   a) Each table is self-contained
   b) Each table is subdivided into smaller per-APN tables
2. Stored in a location close to the relevant forwarding function that needs to access the forwarding table to process packets. For example the Gi forwarding table can be distributed on the Gi boards (that contain the Gi forwarding functions) and each Gi board will contain the part of the Gi forwarding table that it requires;
   a) Each distributed table is self-contained
   b) Each table is subdivided into smaller per-APN tables

1.8.1 Gi Forwarding Table

The Gi Forwarding table contains the entries used to forward a packet arriving at the Gi interface. The Gi Forwarding table contains the information that identifies whether the packet should be routed to an RNC (Gi-to-Iu Forwarding), an SGSN (Gi-to-Gn Forwarding) or to another MOGW (inter-MOGW procedure).

The Gi Forwarding table's entries have the following parameters:

PDP_addr is the IP address as defined in 1.7. This field is the search key used to access the Gi forwarding table to determine how to forward packets in the Gi-to-Iu direction TEID_out is the outgoing TEID for the data plane in the MOGW-to-RNC, MOGW-to-SGSN and MOGW-to-MOGW directions.

Target_tr specifies the forwarding function (including the related target network element e.g. Iu RNC, Gn SGSN, MOGW) and the transport information relative to where the packet should be forwarded. For example, in case of an Iu forwarding function the Target_tr parameter contains the Iu transport information that includes RNC Iu IP address and lower layer addresses (e.g. ATM VPI/VCI, Ethernet MAC address).

Sec_flag is the secondary PDP flag. The flag indicates that at least one secondary PDP context is active for that particular PDP address.

PPF_flag is the Paging Flag. If a packet going in MoGW-to-RNC direction is received and the PPF_flag is set, the conventional 3GPP paging procedure must be initiated. If the Paging flag is set to one then the 4-byte PTMSI must be included in this table.

S_flag is the security flag. This flag indicates that a copy of the packet needs to be sent to an external server for further analysis The MOGW has either an IP-version independent Gi Forwarding table (containing 64-bit long PDP_addr) or IP-dependent Gi Forwarding tables: Gi IPv6 specific forwarding table (128-bit long PDP_addr) and a Gi IPv4 specific forwarding table (32-bit long PDP_addr).

1.8.2 APN Forwarding Table

The APN forwarding table contains information regarding each APN configured in the MOGW. Each APN entry contains the following parameters:

Apn_idx is the APN Logical Index. This value corresponds to the Logical Interface Index of the GTP TEID specified in 1.6

Tunnel_info contains the information on the type of traffic separation mechanism used, such as IP-in-IP, IPsec or Ethernet VLAN, and related parameters such as Tunnel source and destination addresses, negotiated keys, VLAN tag and so on Apn_name is the operators APN name (e.g. "online", "mms")

PDP_prefix stores the IP prefix information (IPv4. IPv6 or both) used for the PDP address assignment including prefix value and the netmask (e.g. for the 3ffe:200::\32 prefix, the prefix value is 3ffe:200 and the netmask is 32)

PHYid stores the list of Gi Physical interface indexes on which the APN is configured.

The APN forwarding table is used to forward appropriately packets to be transmitted on the Gi interface and also to enable a fast ingress filtering mechanism on the Iu ingress filtering described in 1.9.

1.8.3 Gn Forwarding Table

The Gn Forwarding table contains the entry used to route packets arriving at the Gn interface from an SGSN or GGSN. The Gn Forwarding table contains the information on whether the packet should be forwarded to an RNC (Gn-to-Iu Forwarding), or out to the Internet (Gn-to-Gi Forwarding).

The Gn Forwarding table's entries contain the following parameters:

- TEID_in is the TEID contained in the GTP packet arriving at the Gn interface
- TEID_out. This parameter is used for the case in which the packet needs to be forwarded to the Iu forwarding function. The TEID_out represents the GTP TEID to be forwarded to the RNC. In case the packet needs to be forwarded externally onto the Gi then the TEID_out is a 4-byte field that resembles the TEID in chapter 1.6 and fully specifies the Gi forwarding interface (TEID's PHYid field) and APN index (TEID's LOGid field).
- Target_tr specifies the forwarding function (Iu or Gi) where the traffic should be sent and the transport information. The contents of the transport information are different depending on the forwarding function. For an Iu forwarding function the Target_tr parameter contains the Iu transport information that includes RNC Iu IP address and lower layer address (e.g. ATM VPI/VCI, Ethernet MAC address). For the Gi forwarding function the parameter is set to zero (the Gi forwarding function where to send the packet is fully specified in the TEID_out's PHYid field)
- S_flag is the security flag. The flag indicates that a copy of the packet needs to be sent to an external server for further analysis.

1.8.4 Iu-to-Gi Forwarding Table

This forwarding table is used for filtering packets received at the Iu interface as well as packets that need to be forwarded to the P-MOGW (see section 1.16). The Iu-to-Gi Forwarding table's entries contain the following parameters:

- Source_IP is the packet IP source address used as the forwarding table's search key
- TEID_in is the GTP TEID contained in packets received on the Iu interface. This value is carried in the packet's tag appended by the Iu forwarding function. In the inter-MOGW communication case, the TEID_in is the same as the connection id used for inter-MOGW communication described in section 1.16.
- Target_tr specifies the type of forwarding to be performed and the target network element where the traffic should be sent (MOGW or APN) and the transport information. In case of another MOGW the Target_tr parameter contains the transport information that includes MOGW IP address and lower layer address (e.g. ATM VPI/VCI, Ethernet MAC address)
- S_flag is the security flag. The flag indicates that a copy of the packet needs to be sent to an external server for further analysis

1.8.5 Iu-to-Gn Forwarding Table

The Iu-to-Gn forwarding table contains the information used to forward packets from an Iu interface to an SGSN or GGSN. The Iu-to-Gn Forwarding table's entries contain the following parameters:

- TEID_in is the incoming GTP TEID that is used as the forwarding table's search key
- Conn_id_out is the connection identifier that corresponds to the TEID of the outgoing GTP packet if the packet's destination is an SGSN/GGSN.
- Target_tr specifies the type of forwarding to be performed and the target network element (SGSN/GGSN) where the traffic should be sent and the transport information. For example in case of a GGSN the Target_tr parameter contains the Gn transport information that includes GGSN IP address and lower layer address (e.g. ATM VPI/VCI, Ethernet MAC address).
- S_flag is the security flag. The flag indicates that a copy of the packet will be sent to a server for further analysis

1.8.6 Router Advertisement Table (RA Table)

The RA forwarding table is used for neighbour discovery messages that are exchanged between the UE and the MOGW. The RA forwarding table's entries contain the following parameters:

- TEID_in is the incoming GTP TEID that is used as the table's search key
- TEID_out is a 4-byte long parameter that represents the GTP TEID to be appended to IP packets that are to be passed to the Iu or Gn forwarding function
- Target_tr specifies the type of forwarding to be performed and the target network element where the traffic should be sent (in this case an RNC or SGSN) and the transport information. For an RNC the Target_tr parameter contains the transport information that includes RNC IP address and Iu lower layer address (e.g. ATM VPI/VCI, Ethernet MAC address)

1.8.7 Inter-MOGW Connection Mapping Table (Inter-MOGW CoMa Table)

The Inter-MOGW CoMa is located together with the Gi forwarding function of the P-MOGW and the N-MOGW (described in section 1.16.). It is used for forwarding packets based on a connection (or Tunnel) identifier. The CoMa table is used in the MOGW when the packet arrives carrying a connection identifier (such as GTP TEID, GRE key, IP option). The forwarding table is responsible for matching the connection identifier with the correct APN. CoMa tables are only distributed per location and not per APN (see 1.8).

The CoMa table's entries contain the following parameters:

- Connection_id is the Connection identifier in the incoming tunnel (GTP, IP-in-IP, GRE). Typically the same as the TEID value for the incoming Iu connection (TEID_in). This field is the table search key.
- APN_idx is the APN logical index.
- Target_tr specifies the type of forwarding to be performed and the target interface where the traffic should be sent (Iu or Gi) and the transport information. In case of Iu direction the Target_tr parameter contains the transport information that includes RNC IP address and Iu lower layer address (e.g. ATM VPI/VCI, Ethernet MAC address)
- S_flag is the security flag. The flag indicates that a copy of the packet needs to be sent to an external server for further analysis

1.8.8 Inter-MOGW Source IP Mapping Table (Inter-MOGW SIPMa Table)

The Inter-MOGW SIPMa table (Source IP address mapping table) is located together with the Gi forwarding function of the MOGW and is used for forwarding the packets based on their source address. The SIPMa table is used in the MOGW for forwarding packets that are received from another MOGW (described in section 1.16.) and do not carry a connection identifier (such as GTP TEID, GRE key, IP option). For the case in which a packet is to be transmitted on the Gi, the SIPMA table will be used to match the IP source address with the correct APN. For the case in which a packet is received on the Gi and needs to be transmitted to the mobile user, the SIPMA table will be used to match the IP source address with the correct Iu forwarding information (GTP TEID, Iu transport information with RNC IP address, VPI/VCI or MAC). SIPMa tables are only distributed per location and not per APN (see 1.8).

The SIPMa table's entries contain the following parameters:

PDP_addr is the PDP address defined in 1.7. This field is the table's search key TEID_out is the GTP TEID to be appended to packets passed to the Iu forwarding function Target_tr specifies the type of forwarding to be performed and the target network element where the traffic should be sent (Iu or Gi) and the transport information. In the Iu direction case the Target_tr parameter contains the transport information that includes the RNC IP address and Iu lower layer address (e.g. ATM VPI/VCI, Ethernet MAC address)

S_flag is the security flag. The flag indicates that a copy of the packet needs to be sent to an external server for further analysis 1.9 Iu Ingress Filtering The ingress filtering mechanism is used to determine whether the mobile user's packet's have an IP source address that matches the IP address assigned to it during the PDP Context activation procedure. The packet to be filtered is tagged with the TEID and the Logical Interface Index is extracted from it. The Logical Interface Index is used as the search key to perform a lookup in the APN forwarding table to obtain the corresponding PDP address (see section 1.7) as the result. The PDP address found with this procedure is then compared with the IP source address of the packet. If the comparison is positive the packet is forwarded appropriately, otherwise it is discarded. This method increases security by preventing address spoofing security attacks.

1.10 $I_U$-ps to $G_I$ Processing

Figure 14:
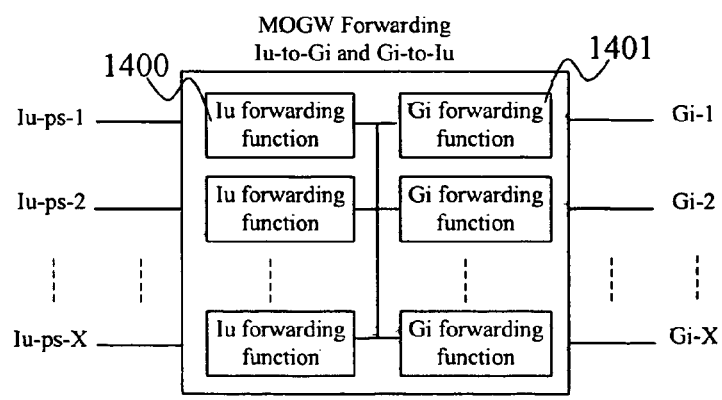
FIG. 14 is a schematic of the Iu-to-Gi and Gi-to-Iu forwarding architecture in accordance with exemplary embodiments of the present invention.

The MOGW performs intelligent processing and forwarding of packets received on the Iu-ps and forwards them to the appropriate Gi interface. This can be subdivided in two functions: the Iu forwarding function 1400 and Gi forwarding function 1401 as illustrated in FIG. 14. Multiple Iu forwarding and Gi forwarding functions may be used, typically running on one or more computing or network processors. A typical implementation involves a one-to-one mapping between a physical interface card and a forwarding function. For example, one physical Iu-ps interface card containing one or more Iu-ps physical interfaces typically executes one Iu forwarding function, where the Iu forwarding function runs on a processor physically located on the Iu-ps card.

Figure 26:
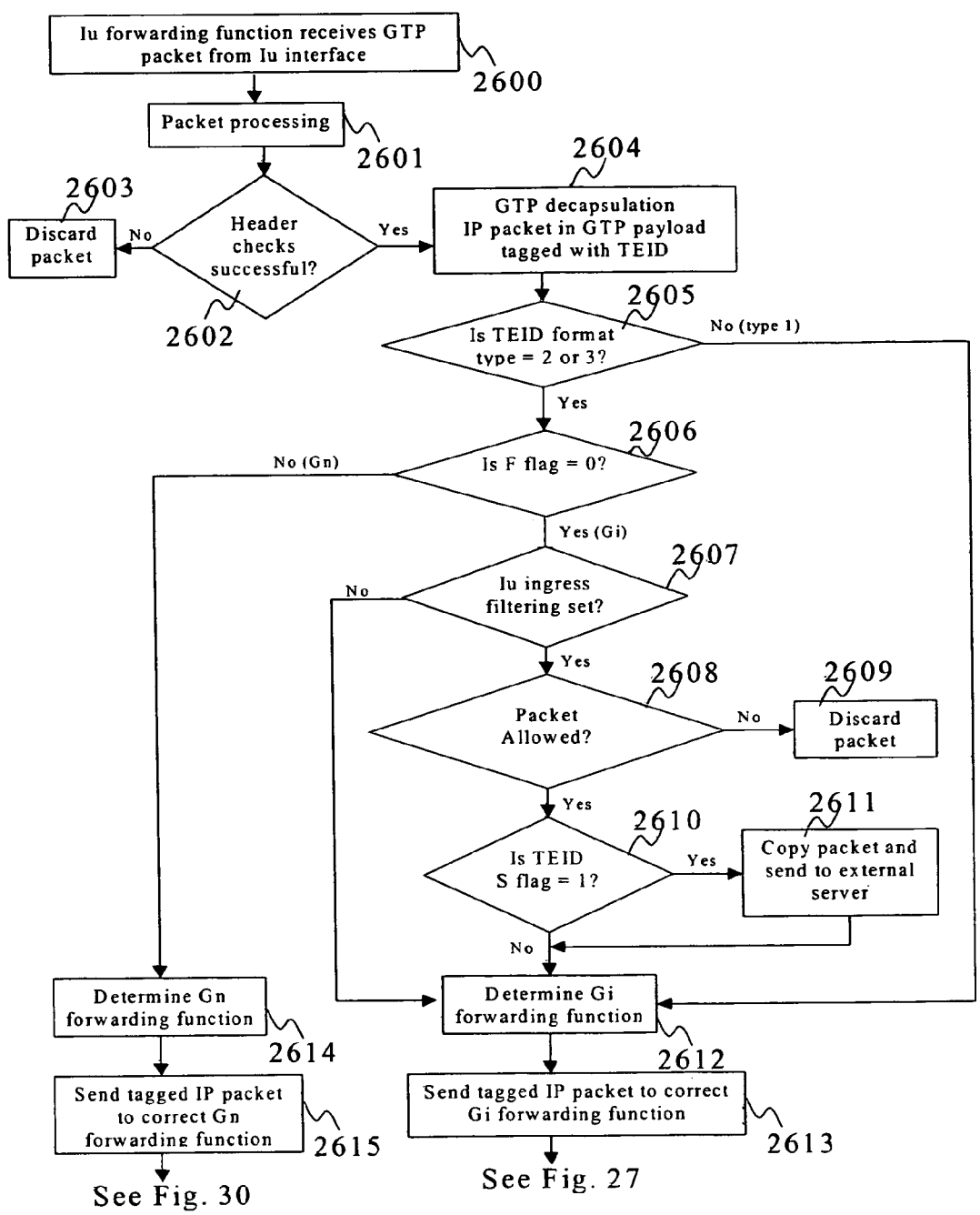
FIG. 26 is a flowchart describing the Iu forwarding function's algorithm performed on receiving a packet from the Iu-ps interface in accordance with exemplary embodiments of the present invention.

The processing at the Iu forwarding function is described as a flowchart in FIG. 26. A GTP Packet is received at the Iu interface in Step 2600 to start this procedure. The GTP, UDP and IP headers are processed in Step 2601. At Step 2602 it is evaluated whether the header checks are successful. If they are not successful ("No" path out of decision step 2602) then the packet is discarded in Step 2603. If they are successful ("Yes" path out of decision step 2602) then the TEID in the GTP header is read, the GTP header is removed and the IP packet carried inside the GTP payload is tagged with the TEID value (Step 2604). The TEID format type is evaluated (Step 2605). If it is not Type 2 or 3 then the procedure jumps to Step 2612. Otherwise if it is Type 2 or 3 ("Yes" path out of decision step 2605) the "F" flag contained in the TEID is checked. In this case the "F" flag must be equal to zero to identify the Gi direction. When the "F" flag is equal to zero then the packet is to be sent to the Gi interface ("Yes" path out of decision step 2606) and it is determined whether the Iu ingress filtering checks should be performed according to the settings in the MOGW. If Ingress Filtering should not be performed ("No" path out of decision step 2607) then the procedure jumps to Step 2612. Otherwise if Ingress filtering should be performed ("Yes" path out of decision step 2607) then the packet's IP source address and TEID are checked to determine if they match the IP source address assigned to the mobile user as described in section 1.9 (Step 2608). If the ingress filtering checks fail ("No" path out of decision step 2608) then the packet is discarded otherwise ("Yes" path out of decision step 2608) if the checks are successful then the packet processing is continued by examining the "S" flag in the TEID (Step 2610). If the "S" flag is set to 1 ("Yes" path out of decision step 2610) then a copy of the packet is sent to an external server for special security checks (step 2611) and processing continues to step 2612. If the "S" flag is set to 0 then processing continues to step 2612 where the Gi function that should process the packet is determined using the Physical Interface Index in the TEID. The IP packet tagged with the TEID is then sent to the appropriate Gi function in step 2613.

Figure 27:
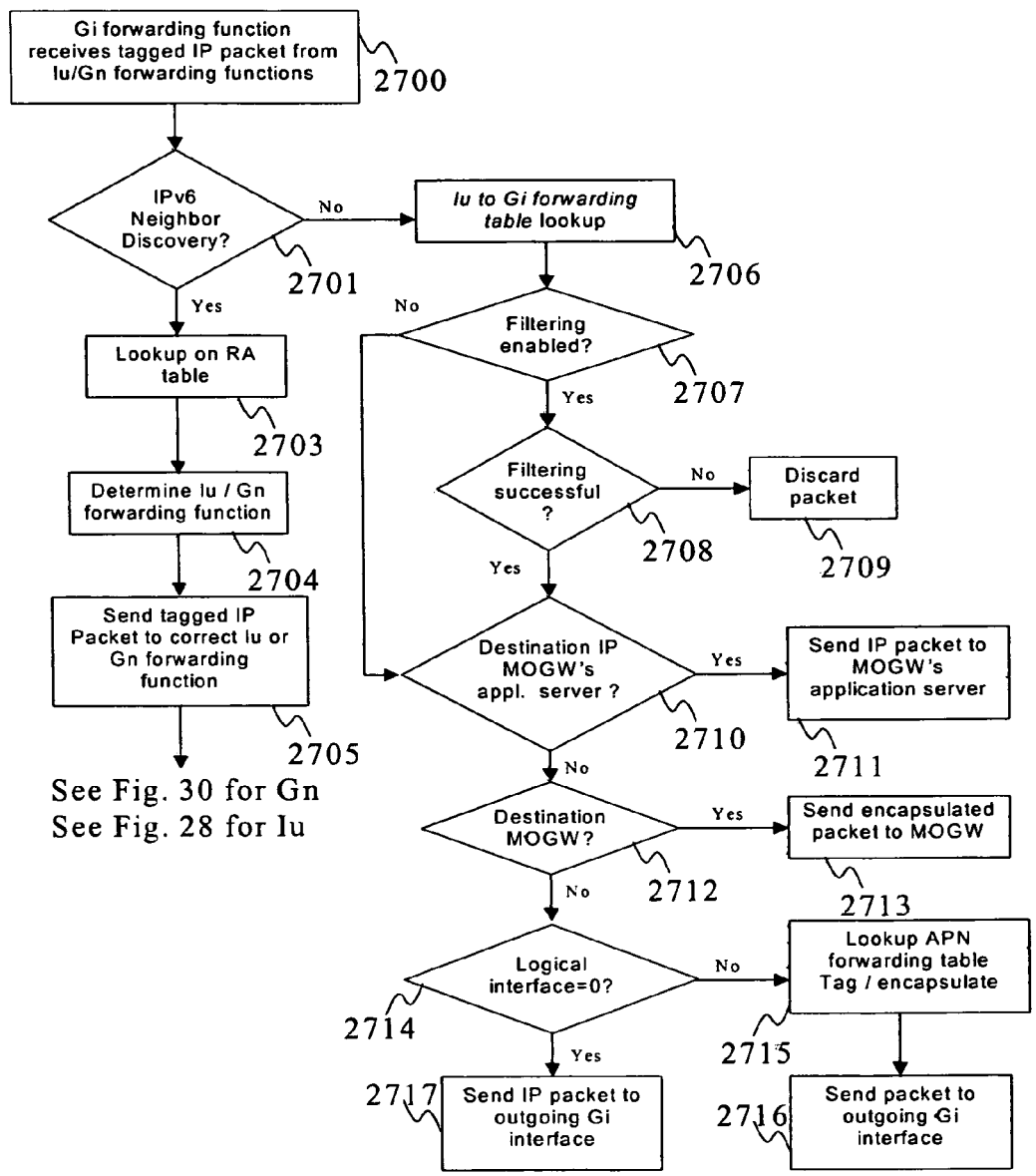
FIG. 27 is a flowchart describing the Gi forwarding function's algorithm performed on receiving a tagged packet from the Iu or Gn forwarding functions in accordance with exemplary embodiments of the present invention.

The processing at the Gi forwarding function is described as a flowchart in FIG. 27. An IP packet with an appended tag is received by the Gi function in Step 2700 to start the procedure. The packet is then examined to determine whether it is an IPv6 Neighbor Discovery packet (Step 2701).

Figure 28:
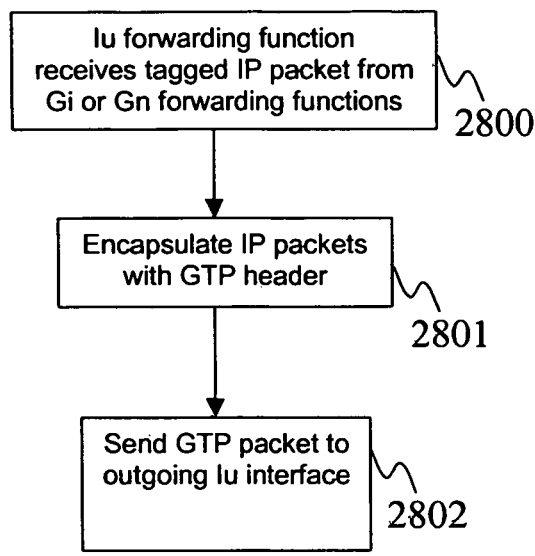
FIG. 28 is a flowchart describing the Iu forwarding function's algorithm performed on receiving a tagged packet from the Gi or Gn forwarding functions in accordance with exemplary embodiments of the present invention.
Figure 30:
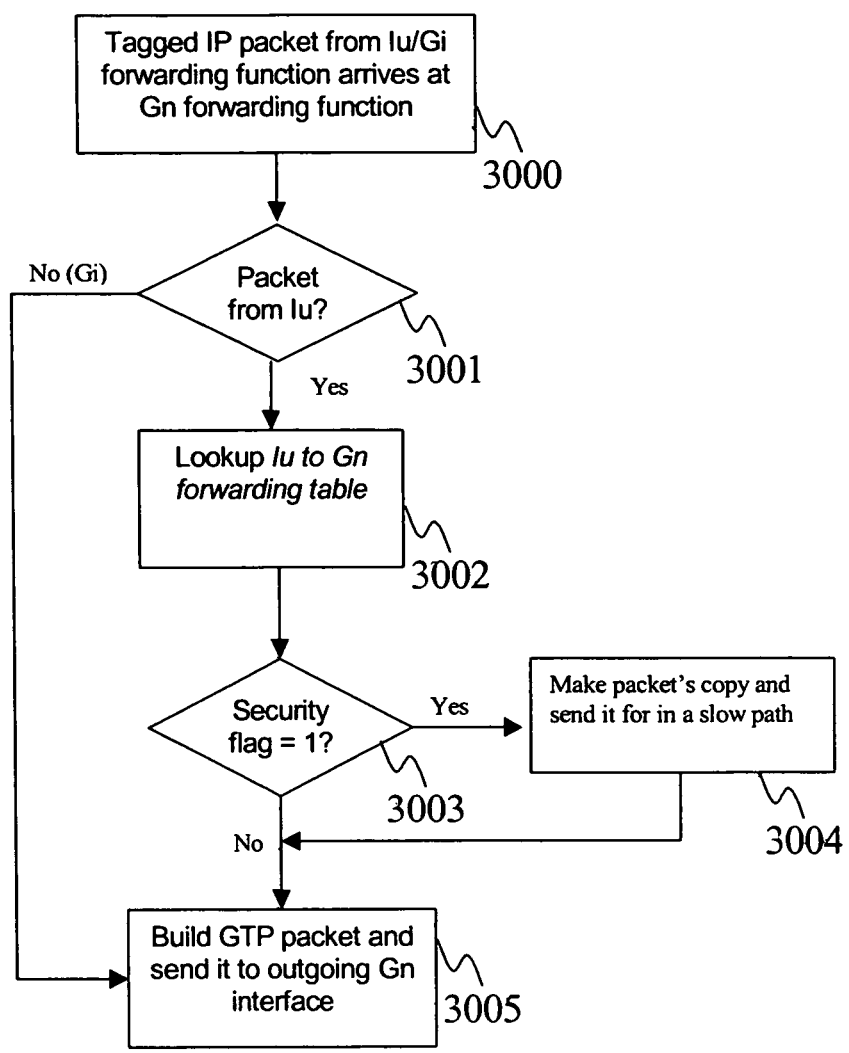
FIG. 30 is a flowchart describing the Gn forwarding function's algorithm performed on receiving a tagged packet from the Iu or Gi forwarding functions in accordance with exemplary embodiments of the present invention.

If it is an IPv6 Neighbor Discovery packet ("Yes" path out of decision step 2701) then an appropriate response is prepared in Step 2703. In case of a Router Solicitation then the Router Advertisement (RA) table described in section 1.8.6 is looked up using the TEID value to determine the IPv6 prefix to use in the Router Advertisement response, the outgoing TEID and the Iu transport information. In case of a Neighbor Solicitation only the outgoing TEID (TEID_out) and Iu transport information are used. The appropriate outgoing Iu or Gn forwarding function is determined using the Iu transport information descriptor in Step 2704. The IP packet is then tagged using the outgoing TEID (TEID_out), Iu transport information and interface type identifier (in this case Iu). The tagged packet is then passed to the appropriate outgoing Iu or Gn forwarding function in 2705. If the packet is passed to the Iu forwarding function the processing algorithm for the Iu forwarding function is illustrated in FIG. 28. A tagged IP packet is received by the Iu forwarding function (in this case from the Gi forwarding function) in Step 2800 in 28. The tag is read, removed and the IP packet is encapsulated in GTP, UDP and IP headers (Step 2801) using the TEID and IP values in the tag to build the GTP and IP headers. The resulting GTP packet is then transmitted on the outgoing Iu interface using the appropriate connection also identified in the tag (Step 2802). Otherwise if the packet is passed to the Gn forwarding function after Step 2705 in FIG. 27 then the Gn forwarding algorithm is performed as illustrated in FIG. 30. The tagged IP packet is received by the Gn forwarding function in Step 3000 of FIG. 30. A check is made on the packet in Step 3001 to determine whether the packet comes from the Iu interface. In the specific case of this section the packet comes from the Gi forwarding function, therefore ("No" path out of decision step 3001) the tag is read, removed and the IP packet is encapsulated in GTP, UDP and IP headers using the TEID and IP values in the tag to build the GTP and IP headers. The resulting GTP packet is then transmitted on the outgoing Gn interface (Step 3005).

If the IP packet is not an IPv6 Neighbor Discovery packet ("No" path out of decision step 2701 in FIG. 27) the IP packet's source address is used to perform a lookup on the Iu to Gi forwarding table in Step 2706. The PDP address described in section 1.7 is used as the search key to perform the look up and the output values are described in 1.8.4. Then in Step 2707 a check is performed to determine whether Gi filtering is enabled. If the Gi Filtering is not enabled ("No" path out of decision step 2707) then the procedure jumps to Step 2710. Otherwise if Gi Filtering is enabled ("Yes" path out of decision step 2707) then the TEID_in value obtained from the table lookup is compared with GTP TEID in the packet's tag in step 2708. If the values are not the same ("No" path out of decision step 2708) then the packet is discarded in Step 2709, otherwise if the values are the same ("Yes" path out of decision step 2708) then the packet's IP destination address is examined in step 2710. If the destination address belongs to one of the MOGW's internal server application functions ("Yes" path out of decision step 2710) then the IP packet is internally forwarded to the appropriate IP address of the application server function or card in the MOGW system (see FIG. 4). If the destination address does not belong to one of the MOGW's internal server application functions ("No" path out of decision step 2710) then the result of the previous Iu to Gi forwarding table lookup (Target_tr) in Step 2706 is used to determine whether the packet's destination should be another MOGW in Step 2712. If the packet's destination is another MOGW ("Yes" path out of decision step 2712) then the result from the previous lookup of the Iu to Gi forwarding table in Step 2706 (i.e. Target_tr and TEID_in) are used to forward the packet to the appropriate MOGW (described in 1.16). In particular for inter-MOGW communication, if the TEID_in value is zero then the packet is tunnelled using simple IP-in-IP, while values different from zero will indicate that the packet will be sent using the TEID_in as tunnel identifier (if GTP-U is used, the TEID_in is equal to the TEID, if the GRE tunnel is used the TEID_in is equal to the key in the GRE extended header, if IP-in-IP is used the TEID_in will be present as an IP header option). If the packet's destination is not another MOGW ("No" path out of decision step 2712) then a check is made to determine what type of forwarding should be performed on the packet in Step 2714. If the Logical Interface in the TEID appended to the packet is equal to zero ("Yes" path out of decision step 2714) then vanilla IP routing is used and the packet is transmitted out from the appropriate Gi physical interface in Step 2717. Otherwise if the Logical Index is different from zero ("No" path out of decision step 2714) then a lookup is made on the APN-forwarding table using the Logical Index as the search key to determine how the packet should be forwarded externally in Step 2715. The appropriate processing will be performed before transmitting the packet on the Gi interface in Step 2716. This processing may involve using an Ethernet VLAN tag.

1.11 $G_I$ to $I_U$-PS Processing

Just like the Iu-to-Gi processing, the Gi-to-Iu processing is broken down into the same two functions: Iu forwarding and Gi forwarding functions as illustrated in FIG. 14. The Gi function 1400 will perform packet reception and processing. It will also perform the forwarding table lookup to determine where to forward the packet. The Iu function 1401 will perform GTP encapsulation and packet transmission.

Figure 29A:
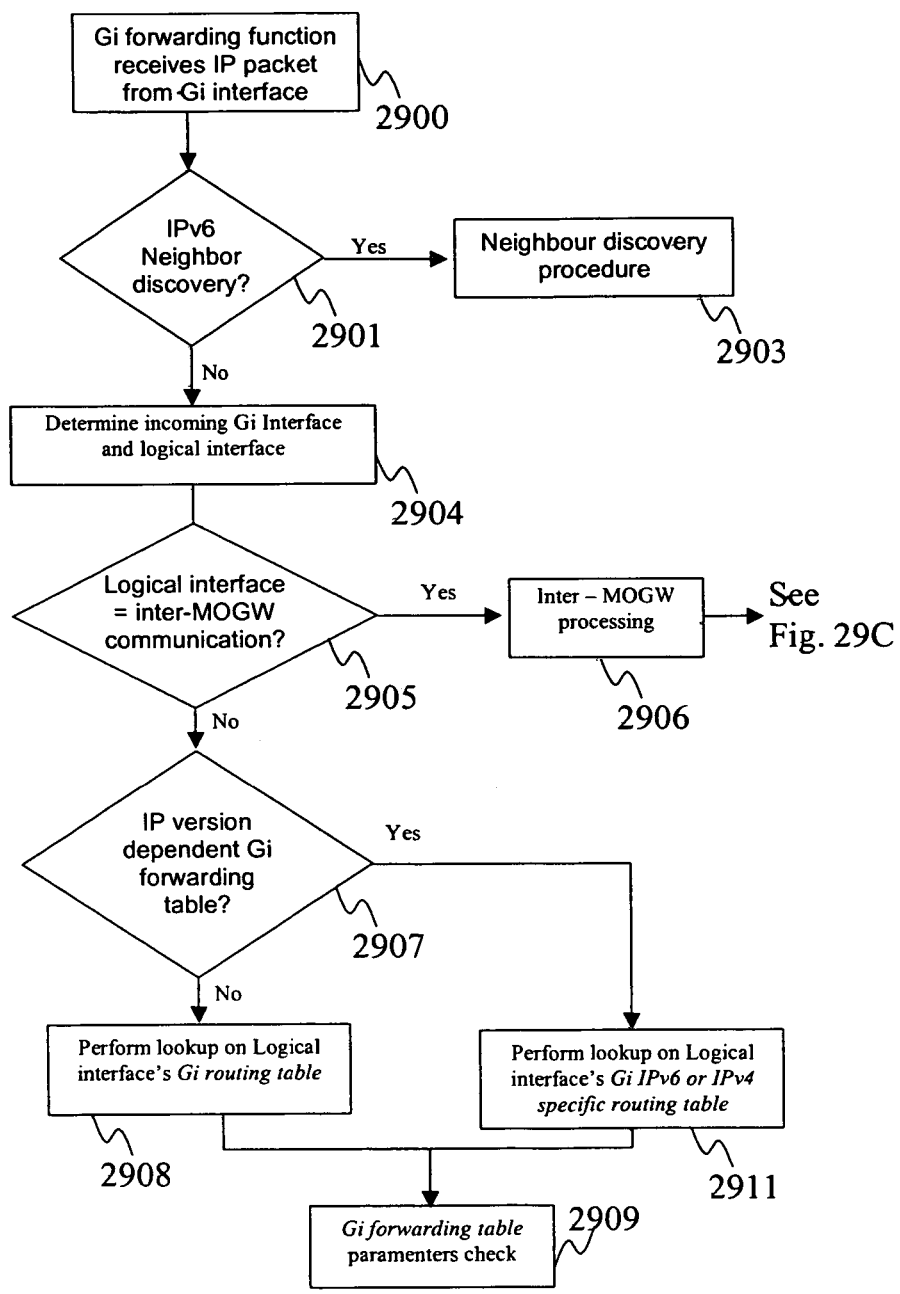
FIGS. 29A, 29B and 29C are flowcharts describing the Gi forwarding function's algorithm performed on receiving an IP packet from the Gi interface in accordance with exemplary embodiments of the present invention.

The processing at the Gi forwarding function is described as a flowchart in FIG. 29A, B and C. An IP packet is received from the Gi interface by the Gi function in Step 2900 FIG. 29A) to start the algorithm. The packet is then examined to determine whether it is an IPv6 Neighbor Discovery packet (Step 2901).

If it is an IPv6 Neighbor Discovery packet ("Yes" path out of decision step 2901) then an appropriate response is prepared in Step 2903 according to conventional IPv6 procedures.

Figure 29B:
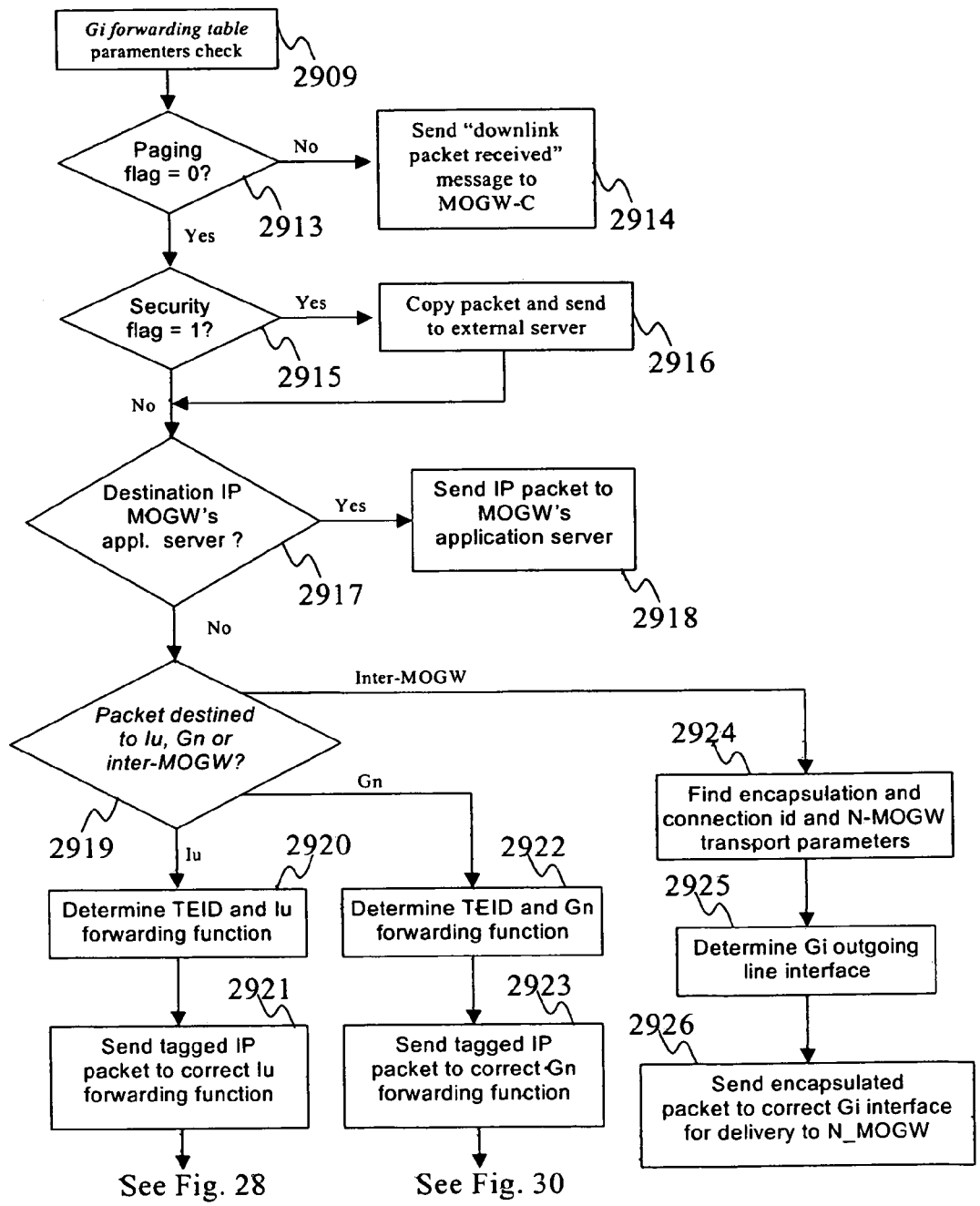
Figure 29C:
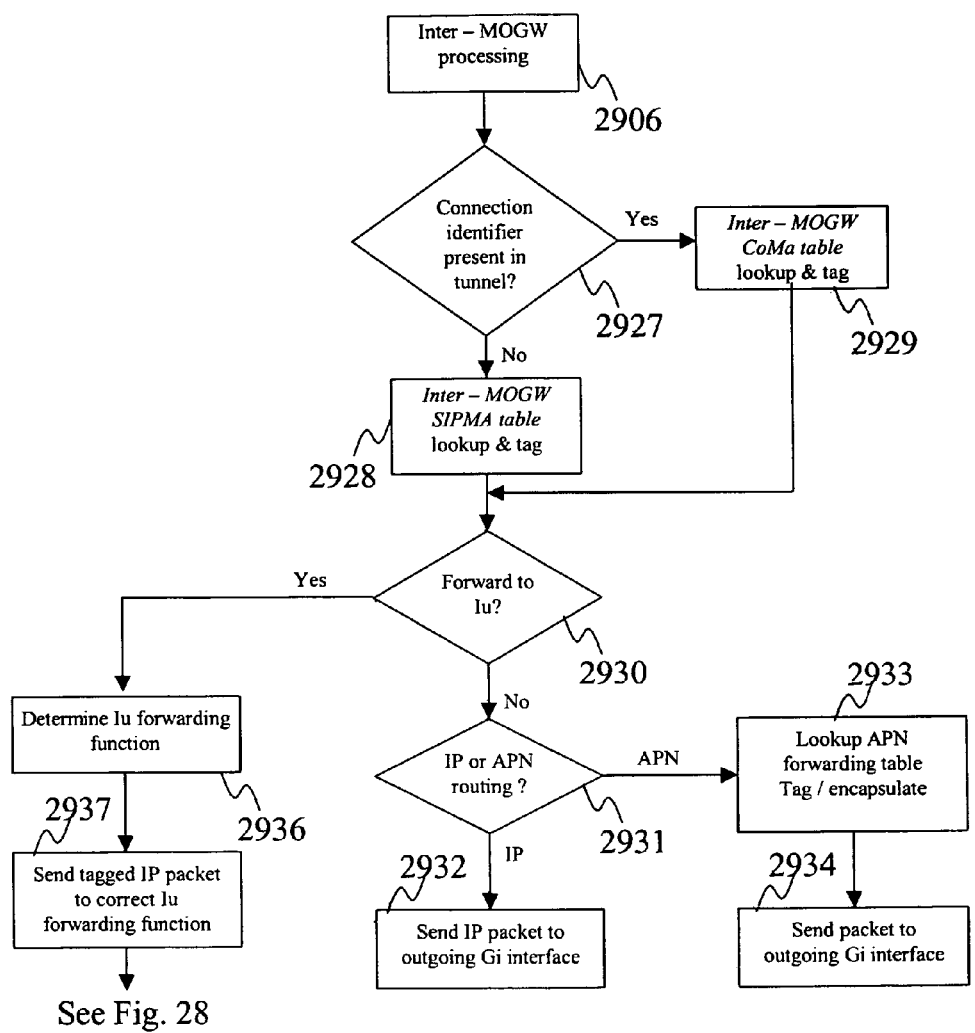

If the IP packet is not an IPv6 Neighbor Discovery packet ("No" path out of decision step 2901) the incoming logical interface (APN) is determined in Step 2904. The Logical interface may be an Ethernet VLAN or an IP tunnel and it corresponds to an APN as described in chapter 1.5. The logical interface is examined in Step 2905 to determine whether it is used for inter-MOGW communication. If it is used for inter-MOGW communication ("Yes" path out of decision step 2905) then Inter-MOGW processing is performed as described in section 1.11.1 and FIG. 29C. Otherwise if the logical interface is not used for inter-MOGW communication ("No" path out of decision step 2905) then a check is made in Step 2907 to determine whether the MOGW is configured with an IP-dependent Gi forwarding table (see section 1.8.1). If IP-dependent Gi forwarding tables are not configured ("No" path out of decision step 2907) then the Gi forwarding table is looked up using Logical Interface identifier and the packet's IP destination address. The result from this lookup is examined in Step 2909 and the algorithm continues as illustrated in FIG. 29B. If IP-dependent Gi forwarding tables are configured ("Yes" path out of decision step 2907) then a lookup is performed on the appropriate IPv4 or IPv6 Gi forwarding table using the Logical Interface Identifier and the packet's destination IP address in Step 2911. The result from this lookup is examined in Step 2909 and the algorithm continues as illustrated in FIG. 29B.

The results of the Gi forwarding table lookup in Step 2909 are the outgoing TEID (TEID_out), paging flag, security flag, transport descriptor (Target_tr) that identifies where to forward the packet (Iu, Gn, inter-MOGW) and eventual Iu or Gn transport information (e.g. RNC Iu IP address or SGSN Gn IP address, physical layer information such as ATM VPI/VCI). This information is appended as a tag to the IP packet. After Step 2909 in FIG. 29B a check is performed (result from the Gi forwarding table lookup) to determine whether the Paging flag is set to zero (Step 2913). If the Paging flag is set to zero ("Yes" path out of decision step 2913) then an internal instruction message is sent to the MOGW-C (301 in FIG. 5) in Step 2914 to inform the control block that the paging procedure must be performed in order to deliver this packet. This message makes the control block start the paging procedure towards the mobile uniquely identified by the PTMSI (also returned as part of the result of the Gi forwarding table lookup in 2908 and 2912). If the Paging flag is not set to zero ("No" path out of decision step 2913) then a check is performed on the results of the Gi forwarding table lookup to determine whether the Security flag is set to one (Step 2915). If the Security flag is set to one ("Yes" path out of decision step 2915) then a copy of the packet is sent to an external server for special security checks (Step 2916) before continuing to Step 2917. If the Security flag is set to zero ("No" path out of decision step 2915) then the processing continues to Step 2917 where a check is made on the packet's destination IP address. If the IP address corresponds to one of the addresses belonging to the MOGW Internal Application Server function ("Yes" path out of decision step 2917) then the IP packet is sent to the internal application server function (Step 2918). Otherwise if the IP address does not correspond to one of the addresses belonging to the MOGW Internal Application Server function ("No" path out of decision step 2917) then a check is made on the packet tag previously obtained from the Gi forwarding table lookup in Step 2919 to determine whether the packet should be sent to the Iu, Gn or Gi forwarding functions. If the result is that the packet should be passed to the Iu forwarding function ("Iu" path out of decision step 2919) then the information in the Target_tr is used to determine the outgoing TEID and the corresponding Iu forwarding function in Step 2920. The already tagged packet is then passed to the appropriate Iu forwarding function in Step 2921. If the result of the decision step 2919 is that the packet should be passed to the Gn forwarding function ("Gn" path out of decision step 2919) then the information in the packet tag is used to determine the outgoing TEID and the corresponding Iu forwarding function in Step 2922. The already tagged packet is then passed to the appropriate Gn forwarding function in Step 2923. Instead if the result of the decision step 2919 is that the packet should be passed to the another MOGW ("MOGW" path out of decision step 2919) then the packet should be handled by the Gi forwarding function as described in Steps 2924, 2925 and 2926. The inter-MOGW encapsulation type, connection identifier and transport parameters are determined by examining the packet's tag in Step 2924. In particular the TEID_out is used as inter-MOGW tunnel's connection identifier. The information in Target_tr is used to identify the Gi outgoing interface in Step 2925 and the appropriately encapsulated packet is then transmitted out of the appropriate Gi interface towards the other MOGW in Step 2926.

The processing algorithm for the Iu forwarding function is illustrated in FIG. 28. A tagged IP packet is received by the Iu forwarding function (in this case from the Gi forwarding function) in Step 2800 in FIG. 28. The tag is read, removed and the IP packet is encapsulated in GTP, UDP and IP headers (Step 2801) using the TEID and IP values in the tag to build the GTP and IP headers. The resulting GTP packet is then transmitted on the outgoing Iu interface using the appropriate Iu transport connection also identified in the tag (Step 2802).

1.1.11.1 Inter-MOGW Processing of Packets Coming from Gi Forwarding Function

Step 2906 in the Gi-to-Iu algorithm description described in FIG. 29A refers to the Inter-MOGW packet processing algorithm. This algorithm is described in FIG. 29C that is started off by the same Step 2906. The packet is examined in Step 2927 to determine whether it is a tunnelled packet that contains a connection identifier in the tunnel (e.g. GRE) header or as an option in the tunnel's external IP header. The connection identifier is typically the packet's incoming TEID and is not present in ordinary IP-in-IP tunnels. Further information on the tunnelling is provided in section 1.16. Before proceeding the tunnel headers are removed leaving the plain inner IP packet. If the connection identifier is present ("Yes" path out of decision step 2927) then the Inter-MOGW CoMa (Connection Mapping) table is looked up using the connection identifier as the search key. The connection identifier obtained from the result of the table lookup is tagged to the packet before proceeding to Step 2930. Otherwise if the connection identifier is not present and the packet is an ordinary IP-in-IP tunnelled packet ("No" path out of decision step 2927) then the Inter-MOGW SIPMa (Source IP address Mapping) table is looked up using the internal IP packet's source address as the search key. The TEID and transport descriptor obtained from the result of the table lookup is tagged to the packet before proceeding to Step 2930. The result of one of these lookups is used to perform a check in Step 2930 to determine whether the Target_tr descriptor (obtained as part of the lookup result) identifies the packet as destined to the Gi or Iu.

If the packet is to be destined to the Iu ("Yes" path out of decision step 2930) then the packet tag is used to identify the appropriate Iu forwarding function that should handle the packet in Step 2936, and the tagged IP packet is then passed to the correct Iu forwarding function in Step 2937. The Iu forwarding function algorithm that follows is illustrated in FIG. 28. The tag is read, removed and the IP packet is encapsulated in GTP, UDP and IP headers (Step 2801) using the TEID and IP values in the tag to build the GTP and IP headers. The resulting GTP packet is then transmitted on the outgoing Iu interface using the appropriate connection also identified in the tag (Step 2802).

If the packet is not to be destined to the Iu ("No" path out of decision step 2930 in FIG. 29C) then it has to be destined to the Gi interface. A check is made on the APN logical index (APN_idx) in Step 2931 to determine whether plain vanilla IP routing or special APN routing should be performed on the packet. The APN logical index value is returned as a result of the Inter-MOGW SIPMa or CoMa table lookup in Step 2928 or Step 2929. If APN routing should not be performed on the packet ("No" path out of decision step 2932) then the IP packet is transmitted on the outgoing Gi interface using normal IP routing mechanisms. Otherwise if APN routing should be performed on the packet ("Yes" path out of decision step 2932) then the APN Forwarding table is looked up using the APN logical index as the search key in Step 2933. The result will specify the type of packet forwarding, tunnelling or tagging required and after this is performed the packet is transmitted on the Gi interface (Step 2934).

1.12 $I_U$-ps to $G_N$ Processing

Figure 15:
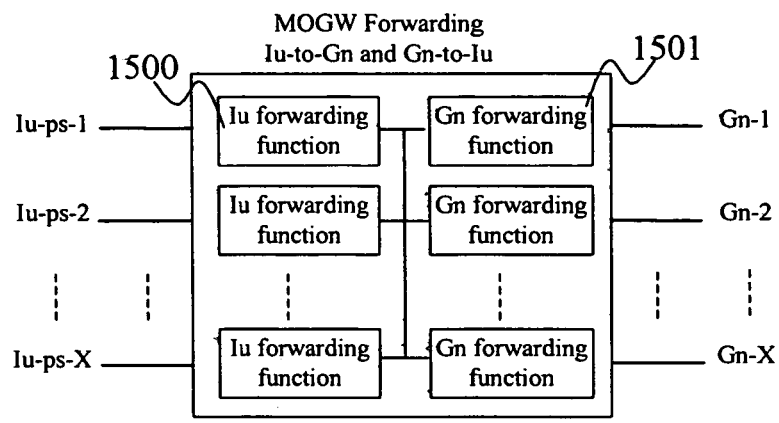
FIG. 15 is a schematic of the Iu-to-Gn and Gn-to-Iu forwarding architecture in accordance with exemplary embodiments of the present invention.

The MOGW performs intelligent processing and forwarding of packets received on the Iu-ps and forwards them to the appropriate Gn interface. This can be subdivided in two functions: the Iu forwarding function 1500 and the Gn forwarding function 1501 as illustrated in FIG. 15. Multiple Iu forwarding and Gn forwarding functions can be used, typically running on one or more computing or network processors. A typical implementation involves a one-to-one mapping between a physical interface card and a forwarding function. For example, one physical Iu-ps interface card containing one or more Iu-ps physical interfaces typically executes one Iu forwarding function, where the Iu forwarding function runs on a processor physically located on the Iu-ps card.

The processing at the Iu forwarding function is described as a flowchart in FIG. 26. A GTP Packet is received at the Iu interface in Step 2600 to start this procedure. The GTP, UDP and IP headers are processed in Step 2601. At Step 2602 it is evaluated whether the header checks are successful. If they are not successful ("No" path out of decision step 2602) then the packet is discarded. If they are successful ("Yes" path out of decision step 2602) then the TEID in the GTP header is read, the GTP header is removed and the IP packet carried inside the GTP payload is tagged with the TEID value (Step 2604). The TEID format type is evaluated (Step 2605). In this case the format type must be of type 2 or 3 or similar ontaining the "F" flag ("Yes" path out of decision step 2605) therefore the "F" flag contained in the TEID is examined. In this case the "F" flag will be zero to identify the Gn direction. If the "F" flag is equal to 0 (zero) then the packet is to be sent to the Gn interface ("No" path out of decision step 2606), the destination Gn forwarding function is determined (Step 2614) using the Physical Interface Index in the TEID and the IP packet is tagged and sent to the appropriate Gn forwarding function (Step 2615).

The processing at the Gn forwarding function is described as a flowchart in FIG. 30. The tagged IP packet is received by the Gn forwarding function in Step 3000 of FIG. 30. A check is made on the packet in Step 3001 to determine whether the packet comes from the Iu interface. In this specific case the packet comes from the Iu forwarding function, therefore ("Yes" path out of decision step 3001) and a lookup is made on the Iu-to-Gn forwarding table using the TEID in the packet's tag as search key. The "S" flag in the result of this lookup is examined in Step 3003. If the "S" flag is equal to one ("Yes" path out of decision step 3003) a copy of the packet is made and sent to an external server for processing (Step 3004) before continuing with Step 3005. Otherwise if the "S" flag is not equal to one ("No" path out of decision step 3003) then Step 3005 is performed. The packet's tag is read, removed and the IP packet is encapsulated in GTP, UDP and IP headers using the TEID and IP values in the tag to build the GTP and IP headers. The resulting GTP packet is then transmitted on the outgoing Gn interface.

1.13 $G_N$ to $I_U$-PS Processing

Just like the Iu-to-Gn processing, the Gn-to-Iu processing is broken down into the same two functions: Iu forwarding and Gn forwarding functions as illustrated in FIG. 15. The Gn function 1500 will perform packet reception and processing. It will also perform the Gn to Iu forwarding table lookup to determine where to forward the packet. The Iu function 1501 will perform GTP encapsulation and packet transmission.

Figure 31:
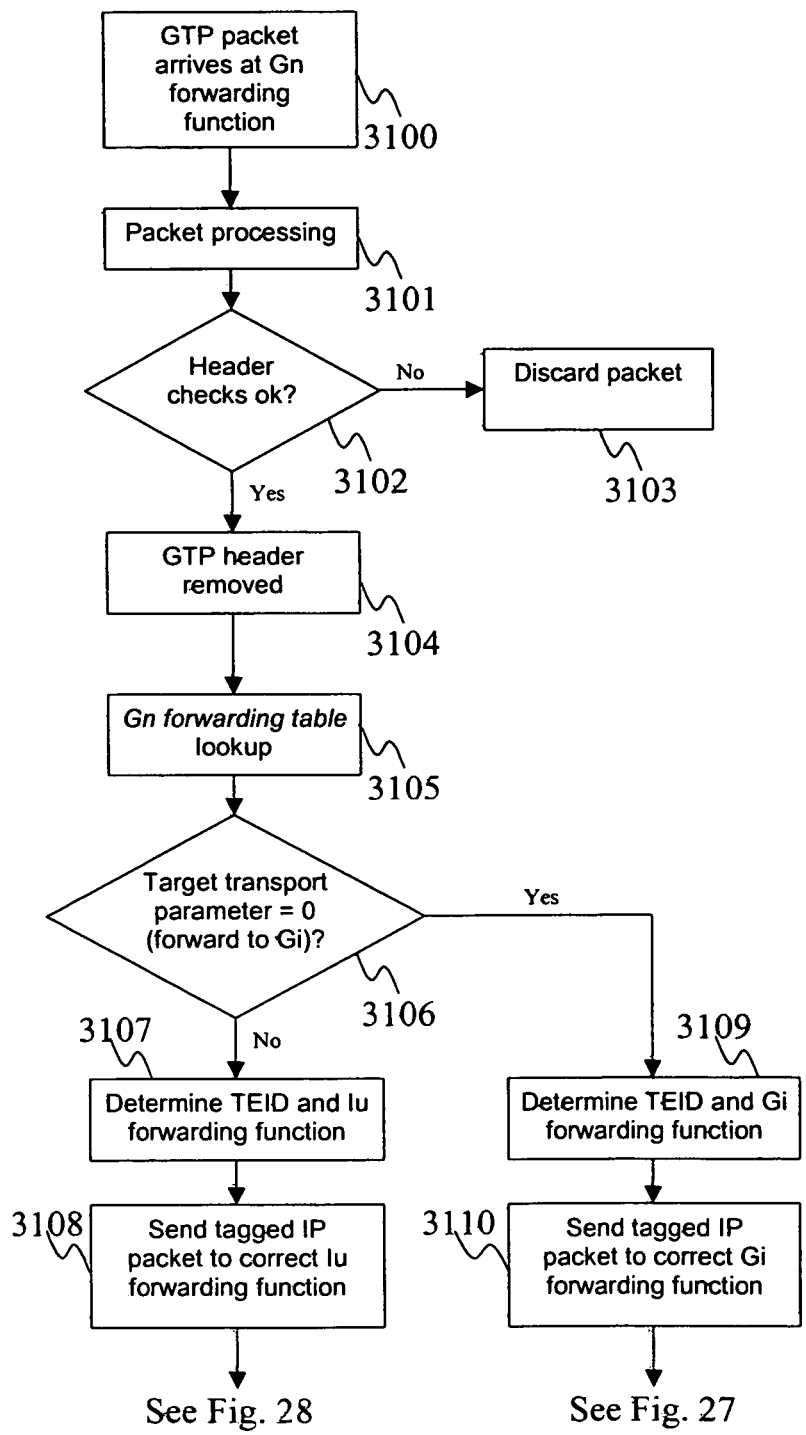
FIG. 31 is a flowchart describing the Gn forwarding function's algorithm performed on receiving a packet from the Gn interface in accordance with exemplary embodiments of the present invention.

The processing at the Gi forwarding function is described as a flowchart in FIG. 31. A GTP Packet is received from the Gn interface in Step 3100 to start this procedure. The GTP, UDP and IP headers are processed in Step 3101. At Step 3102 it is evaluated whether the header checks are successful. If they are not successful ("No" path out of decision step 3102) then the packet is discarded in Step 3103. If they are successful ("Yes" path out of decision step 3102) then the TEID in the GTP header is read, the GTP header is removed (Step 3104). Then the Gn Forwarding table is looked up in Step 3105 using the TEID as the search key. This is done to identify whether the packet should be forwarded to a certain Iu or Gi forwarding function. To achieve this the Target-tr resulting from the lookup is examined in Step 3106.

If Target_tr determines that the destination is the Gi ("Yes" path out of decision step 3106) then the result of the lookup will have provided the TEID_out that identifies the outgoing TEID connection and the Gi forwarding function that should handle the packet (TEID PHYid field) in Step 3109. The tagged IP packet is then sent to the correct Gi forwarding function and the Gi forwarding function algorithm is performed as illustrated in FIG. 27. The Gi forwarding function algorithm flowchart is described in section 1.10.

Otherwise if Target_tr determines that the destination is the Iu ("No" path out of decision step 3106) then the result of the lookup will have provided the TEID_out that identifies the outgoing TEID connection and the Iu forwarding function that should handle the packet (TEID PHYid field). The IP packet is tagged with the information resulting from the lookup in Step 3105, then sent to the correct Iu forwarding function and the Iu forwarding function algorithm is performed as illustrated in FIG. 28. A tagged IP packet is received by the Iu forwarding function (in this case from the Gn forwarding function) in Step 2800 in FIG. 28. The tag is read, removed and the IP packet is encapsulated in GTP, UDP and IP headers (Step 2801) using the TEID and IP values in the tag to build the GTP and IP headers. The resulting GTP packet is then transmitted on the outgoing Iu interface using the appropriate Iu transport connection also identified in the tag (Step 2802).

1.14 Address Prefix Redistribution and Assignment

Each MOGW will initially be assigned one or more IPv6 and IPv4 prefixes to be used for address assignment to mobile users. These prefixes can broken up into multiple smaller IP prefixes for local storage in the MOGW.

It is possible that at some point one or more of the MOGWs in the same operator's network reach the stage where most of the addresses belonging to the prefixes assigned to them for a certain APN have been used up (i.e. they are currently assigned to mobiles). It is possible to configure the threshold that establishes the point of address exhaustion that will trigger this procedure (example: 70% of assignable addresses are utilized). Such a threshold can be set at any value between 10% and 99% of the available address space per APN. At the same time, due to the typically uneven geographical distribution of mobiles, some MOGWs may have utilized only a small part of the addresses in a certain APN whereas other MOGWs may have reached the address exhaustion threshold for the same APN.

In order to locate the address prefixes where needed this could be done either:
- manually (using studies and measures of where most users will be connecting from and therefore which MOGWs will require more addresses) or
- dynamically by using one of the two mechanisms described in the following sections.

1.14.1 Dynamic Address Redistribution Mechanism

In order to perform address prefix redistribution between MOGWs it is possible to use the functions in a new inter-MOGW protocol. The protocol is described in following sections. The requesting MOGW can use the protocol to poll other MOGWs for address prefix availability in the required APN. If any address prefixes are available it will be able to request them to be transferred under its control. Once this prefix transfer procedure has completed the MOGW must immediately start advertising this prefix on the appropriate Gi interface using an IP routing protocol such as the Open Shortest Path First (OSPF) or Border Gateway Protocol (BGP).

1.14.2 Dynamic Centralized Address Assignment Mechanism

Instead of redistributing addresses it is possible to allocate address prefixes from a special central address allocation server. When the MOGW is started and configured with APNs it could request address prefixes from this server. As a MOGW reaches the address exhaustion threshold it can then request for more addresses. In all cases when the MOGW receives a new address prefix it must immediately start advertising this prefix on the appropriate Gi interface using an IP forwarding protocol such as the Open Shortest Path First (OSPF) or Border Gateway Protocol (BGP).

The protocol between the MOGW and the address allocation server could be the Dynamic Host Configuration Protocol (DHCP). The conventional DHCP cannot be used as is since it does not support IPv4 address prefix assignment and revocation. For the purpose of this invention the DHCP protocol is extended to support assignment and revocation of an entire address prefix.

1.15 Alternative Packet Forwarding Solution for Corporate Mobile Users

Figure 16:
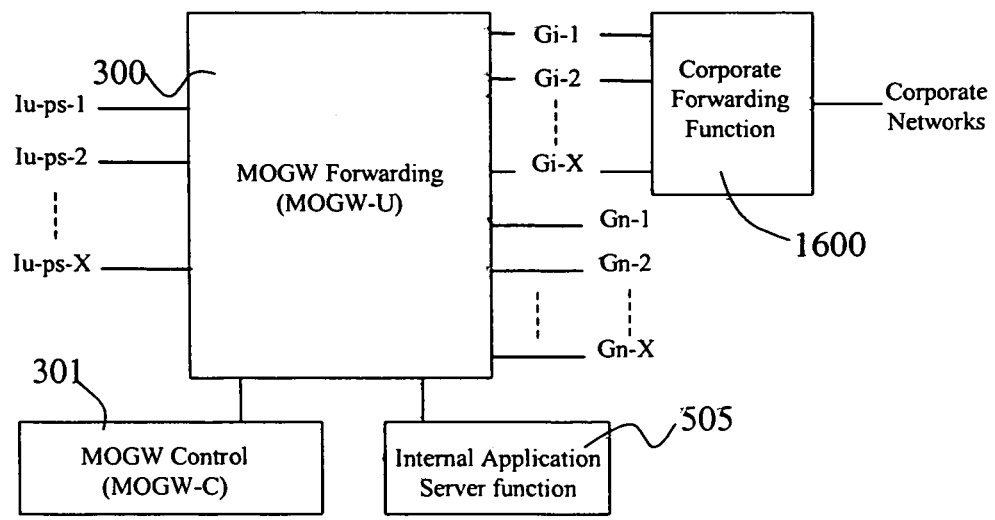
FIG. 16 illustrates a schematic of the alternative Corporate Mobile User Traffic Forwarding and Internal Application Server architecture in accordance with exemplary embodiments of the present invention.

In some network configurations there can be several MOGWs and a small number of a certain corporate's address prefixes. Therefore it may be difficult to distribute that corporate's address prefixes between MOGWs as described in section 1.14. A solution for this case involves a new corporate forwarding function that may be implemented as part of one of the MOGWs in the network or as a separate entity as illustrated in FIG. 16.

The corporate function 1600 acts as a special type of Mobile Home Agent (HA). The conventional HA on which this is based is described in the Internet Engineering Task Force's Mobile IPv6 (MIPv6) and Mobile IPv4 (MIPv4) specifications. The MOGW-C 301 and MOGW-U 300 functions instead act as a Mobile IP Mobile Node (MN). The corporate function 1600 receives Mobile IP signalling messages from the MOGW-C 301 once a connection (PDP Context) has been requested by a corporate mobile user (UE). The Mobile IP message from the MOGW-C 301 function to the corporate function contains the Home Address, the Care-of Address of the Mobile User (UE) and a special proprietary corporate identifier to identify the exact corporate entity that the mobile user belongs to. The Home Address is the mobile user's address and it may be provided by the corporate mobile user or it may be dynamically assigned by the corporate function. The Care-of address is an address that belongs to the MOGW-U and is configured on of its interfaces towards the corporate function. Finally the corporate identifier determines the specific corporate APN.

When the Mobile IP Registration Request (MIPv4) or Binding Update (MIPv6) message is sent from the MOGW and received by the corporate function 1600 it contains the corporate identifier and may contain a Home Address. This Home Address would have been the same as the IP address requested by the mobile user during PDP Context Activation phase. If the Home Address is present and has not already been assigned to another mobile user (with the same corporate identifier e.g. company X) then a Mobile IP response message will be sent back to the MOGW-C 301 and the exchange will be completed successfully. If the address is already in use then the procedure fails and needs to be repeated with another address. However if the mobile user does not request a specific IP address during PDP Context activation, then the Home Address is not present in the Mobile IP Registration Request or Binding Update message. Instead a corporate identifier is always present in the Mobile IP Registration Request or Binding Update message. This is achieved by enhancing Mobile IP messages between MOGW-C and the corporate function with a special extension containing the corporate identifier (APN) which the Mobile IP messages are related to. The Corporate function will use the corporate identifier to assign the appropriate Home Address to the mobile user and return it to the MOGW in the Mobile IP Registration Reply or Binding Acknowledgement.

This procedure establishes an IP-in-IP tunnel between the MOGW and the corporate function. The corporate function will advertise the corporate prefixes using common IP routing protocols. All packets for the corporate mobile user received at the corporate function will be forwarded to the MOGW using the established tunnel, and vice versa. When a corporate mobile user moves between MOGWs, the tunnel information and the tunnel itself will be transferred from the old to the new MOGW.

The corporate function is a special type of Mobile IP Home Agent because it has the ability to receive incoming packets through the IP-in-IP tunnel with the MOGW and transmit them through the appropriate IPsec tunnel to the corporate's security gateway or to a leased line to a corporate network. The same procedure occurs in the opposite direction. In order to identify packets sent by mobile users belonging to different corporates the tunnelled packets include a corporate identifier. This can be done using GRE tunnelling, where the GRE header contains the corporate identifier, or by introducing an IPv6 option header to contain the corporate identifier.

The IP-in-IP tunnel could also be replaced with bidirectional VLAN tagging between MOGW-U and Corporate function. This also requires a change to Mobile IP messages between MOGW-C and the corporate function. The modified Mobile IP messages contain a VLAN tag identifier field that logically replaces the standard Mobile IP care-of address.

1.16 Inter-MOGW Mobility

Figure 17:
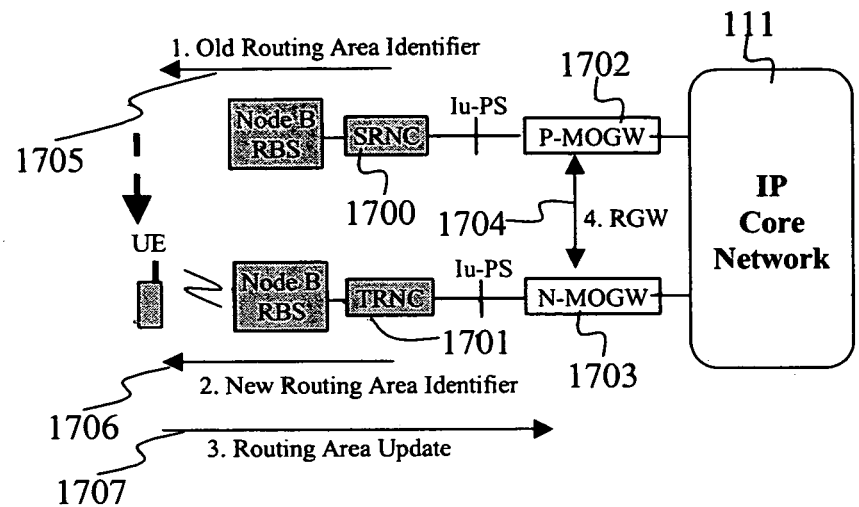
FIG. 17 illustrates a schematic of the signalling flows for the Simple Inter-MOGW Mobility Procedure in accordance with exemplary embodiments of the present invention.

When a mobile terminal (UE) moves between two RNCs that are connected to different MOGWs then the Inter-MOGW procedure is performed. This procedure is needed to maintain connectivity between the mobile terminal and external IP networks it may be communicating with as it moves. As illustrated in FIG. 17 the mobile moves between an SRNC 1700 (Source RNC) connected to P-MOGW 1702 (Previous MOGW) to the TRNC 1701 (Target RNC) connected to N-MOGW 1703 (New MOGW).

There are two main Inter-MOGW Mobility cases which are initiated by the following events:

Simple Mobility: The MOGW receives a Routing Area Update (RAU) or combined Routing Area/Location Area (RAU/LAU) containing a Routing Area Identifier (RAI) which is different from any of its own RAIs. No preceding SRNS Relocation signalling message was received for this mobile terminal on the Iu-ps interface.

Anticipated Mobility: The MOGW (P-MOGW) receives a SRNS Relocation Required message from the RNC on the Iu-ps interface. This message contains an identifier for the new RNC (using the Target ID) which the mobile terminal will be shortly handed off to.

The first case occurs after the mobile terminal has moved to a new RNC connected to a new MOGW (as described previously). No Iu-ps SRNS Relocation messages are used. The terminal receives a new RAI (part of the broadcast radio system information) which is different from its previously stored RAI. Therefore the mobile terminal determined that it has changed Routing Area and performs the Routing Area Update procedure towards the new MOGW.

In the second case the P-MOGW can determine the address of the TRNC and N-MOGW from the contents of the SRNS Relocation Required message received on the Iu-PS. The P-MOGW is configured with the information necessary to map the content of the "Relocation Required" message to obtain the IP address of N-MOGW.

The MOGWs communicate on the Gi interface and the user traffic forwarding procedures are described as part of the Gi-related forwarding function algorithms.

1.16.1 The RGW Protocol (Inter-MOGW or Relocate-Gateway Protocol)

The RGW mobility management protocol allow for both simple and anticipated mobility scenarios. The protocol creates a tunnel interface between P-MOGW and N-MOGW. It also transfers the mobility management, session management, security and other context information related to the UE from P-MOGW and N-MOGW.

Figure 24:
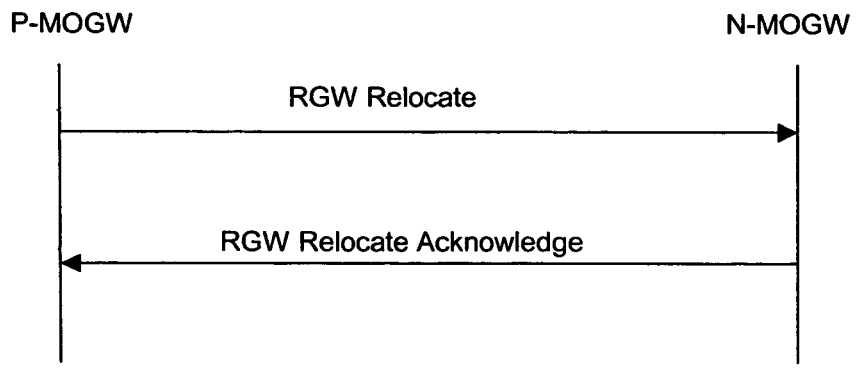
FIG. 24 illustrates the message exchange between P-MOGW and N-MOGW for the Anticipated Inter-MOGW mobility procedure in accordance with exemplary embodiments of the present invention.
Figure 25:
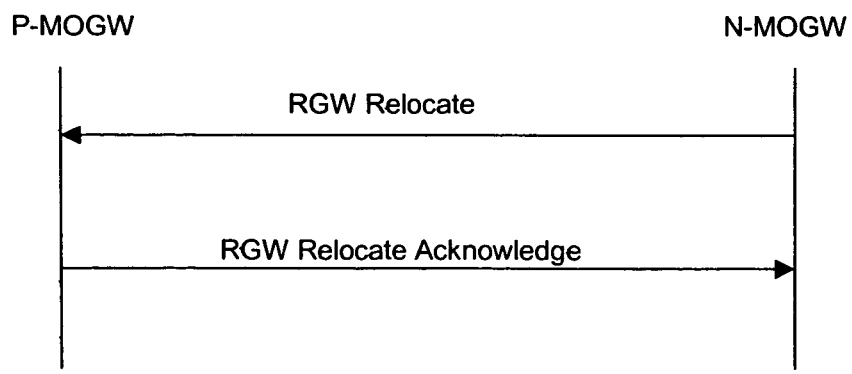
FIG. 25 illustrates the message exchange between P-MOGW and N-MOGW for the Simple Inter-MOGW mobility procedure in accordance with exemplary embodiments of the present invention.

The protocol consists of a single Request-Reply message transfer that can be initiated by either P-MOGW or N-MOGW. The messages are: Relocate and Relocate Acknowledge. The RGW mobility protocol message flows are illustrated in FIG. 24 and FIG. 25 respectively for the anticipated and simple mobility scenarios, respectively.

The Relocate message contains the following fields:
Message Type: This field identifies whether the message is to start the UE Relocation (create a tunnel), terminate the UE Relocation (remove a tunnel) or start advertising the host router for the host-route case described in Error! Reference source not found.
Message source: This field identifies the direction of mobility. That is, whether the message comes from P-MOGW or N-MOGW. This is needed to reuse the same message for anticipated and simple mobility scenarios.
Message id: This is a message identifier that is unique between the two MOGWs
UE_id: This field contains the IMSI assigned to the UE
Tunnelling mechanism: This field indicates the tunnelling method that should be used (example: IP-in-IP, GRE, proprietary)
Tunnel identifier: This field contains the tunnel identifier used for forwarding purposes that is typically the same as the TEID.
Tunnel Lifetime: This field contains the lifetime of the tunnel IP address: This field contains an IPv4, IPv6, or both addresses assigned to the UE UE context information: This field is only included when the message is being sent from P-MOGW to N-MOGW. The following fields are included in this message:

APN: This field contains the APN

APN-properties: This field contains the APN configuration properties for the purpose of routing Mobility & Session Management, Radio Bearer and Security context: This field contains all the information regarding the UE's state.

Other MOGW context: This field contains information describing other parameters that are MOGW-specific for the UE. For example this includes the TEID formatting.

The Relocate Acknowledge message contains the following fields:

Message id: This contains the same id sent in the UE Relocation message

Status: This field indicates whether the operation was successful and why

Tunnel Identifier: This field contains the tunnel identifier used for forwarding purposes that is typically the same as the TEID.

When this message is sent from P-MOGW it also includes the UE context information described earlier.

1.16.2 Simple Inter-MOGW Mobility Procedure

FIG. 17 illustrates the simple MOGW Mobility procedure. This procedure is performed if the MOGW receives a RAU message from a UE without having previously received the SRNS Relocation procedure from the UTRAN on the Iu interface for that same UE.

As defined in the 3GPP standards, when the UE moves to the new RNC (NRNC) it will receive the new Routing Area Identifier (RAI) 1706. It compares the old RAI 1705 and new RAI 1706. If they differ the UE determines that it must perform the Routing Area Update (RAU) procedure. The RAU message 1707 sent by the UE will contain the Old RAI.

When the N-MOGW receives the RAU message 1706 it will identify the P-MOGW IP address using the Old RAI it received. The MOGW will use a RAI table containing matching RAI and MOGW IP address entries. The N-MOGW 1703 will use the MOGW protocol 1704 to communicate with the P-MOGW 1702 to perform one of the following:

Tunnel Option: N-MOGW requests the establishment of a tunnel between N-MOGW and P-MOGW. The P-MOGW will confirm the tunnel creation.

Host-Route Option: N-MOGW sends a request to the P-MOGW to take-over the IP address of the mobile terminal which has moved. The P-MOGW will confirm and pass the ownership of the address to the N-MOGW. The P-MOGW will no longer advertise this address.

The second option is less efficient in certain cases since the time taken for the routing protocol (e.g. OSPF, BGP, IS-IS, RIP) to process the routing advertisement and route traffic to N-MOGW may signify that more data packets will be lost since they will be misrouted to P-MOGW.

The protocol exchange 1704 will also be used to transfer the information regarding the mobile user from P-MOGW to N-MOGW. This includes Session Management, Mobility Management and Security states for the UE. These are transferred to the New MOGW in the "RGW Relocate Acknowledge" message.

1.16.2.1 Tunnel Option

Figure 18:
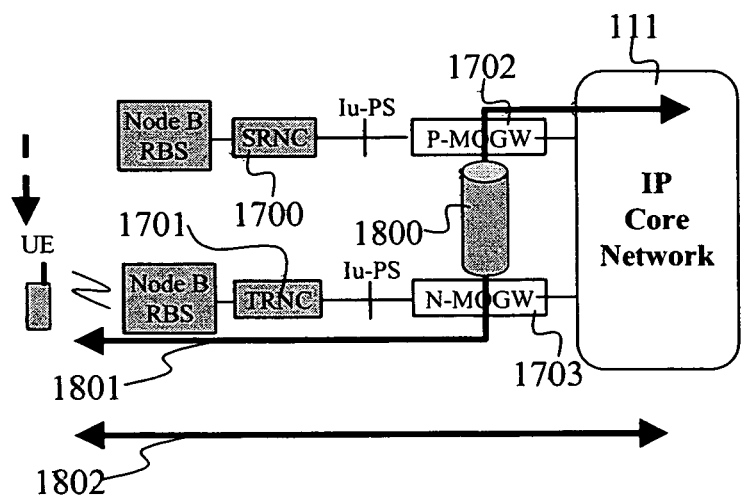
FIG. 18 illustrates a schematic of the traffic flows for the Simple Inter-MOGW Mobility Procedure in accordance with exemplary embodiments of the present invention.

The resulting traffic flow after the simple inter-MOGW handoff procedure is illustrated in FIG. 18. The tunnel 1800 between N-MOGW 1702 and P-MOGW 1703 will be used for traffic to and from the UE. This will allow the UE to maintain its IP address or addresses for one or more of its ongoing connections.

In the case of IPv6, the UE will form its address based on the prefix received in the prefix option of IPv6 Router Advertisement messages. Immediately after tunnel creation, the N-MOGW will send its own unsolicited Router Advertisement to the IPv6 UE. This will allow the UE to obtain a new IPv6 address belonging to the address prefix assigned to the N-MOGW. New connections (e.g. web browser sessions) will use this new address or addresses. Note that the P-MOGW will not send its Router Advertisements to the UE over the tunnel interface. The UE may also have long-lasting connections which were started when it was connected to the P-MOGW. The UE will continue using the old IPv6 address belonging to the P-MOGW address space until these sessions are closed (e.g. Voice over IP call is terminated). Communication will be maintained by using the tunnel 1800. This is traffic flow 1801. After session termination the old address will not be used any more since the Router Advertisement containing the prefix option relative to this address is no longer received, according to conventional IPv6 behaviour. At this point the IPv6 traffic flow becomes 1802.

The same is not possible in IPv4 since, typically, the IPv4 address is not formed using Router Advertisements. Therefore for IPv4 communication in the inter-MOGW scenario, tunnel 1800 will always be used until either a) the PDP Context is deactivated by the mobile user b) the PDP Context is deactivated by the MOGW. The MOGW may deactivate the PDP Context when it determines that it has not been utilized for a certain amount of time. When a new PDP Context is activated it will create a traffic flow according to 1802.

1.16.2.2 Host-Route Option

According to the procedure already described in 1.16.2, the N-MOGW sends a request to the P-MOGW to take-over the IP address of the mobile terminal which has moved. The N-MOGW will then advertise a route for the mobile terminal's IP address (e.g. host route) in its routing protocol (e.g. OSPF, BGP) on the Gi interface. When the routing protocol will have propagated in the IP network, traffic to the IP address in question will be routed to N-MOGW instead of the P-MOGW. The resulting traffic flow is shown in FIG. 18 as 1802. In this case the tunnel 1800 is not applicable and traffic flow 1801 is also not applicable.

1.16.2.3 Complete Protocol Diagram for Simple Inter-MOGW Mobility Procedure

Figure 19:
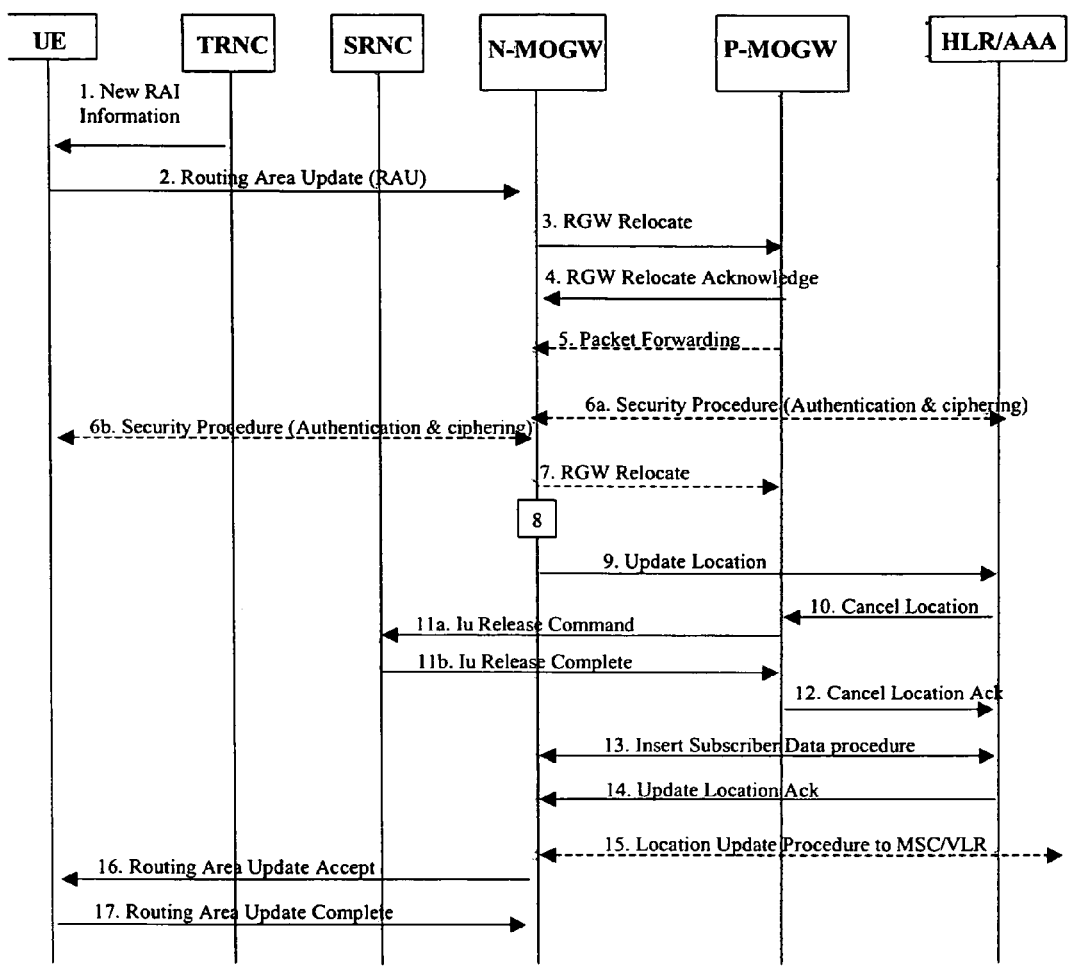
FIG. 19 illustrates the signalling message exchange for the Simple Inter-MOGW Mobility procedure in accordance with exemplary embodiments of the present invention.

This procedure assumes that the UE receives a new Routing Area Identifier (RAI) which does not belong to the MOGW which it was connected to previously. That is, this is a procedure for Inter-MOGW Mobility. The procedure is illustrated in FIG. 19. As described previously the HLR and AAA may be integrated.

Following is a description of the numbered message exchanges in FIG. 19:

1) New RAI Information

This UE receives information that it is now in a new Routing Area identified by the New Routing Area Identifier (RAI).

2) Routing Area Update (RAU)

3) A message that is sent by the UE when it receives new RAI information (i.e. it has changed Routing Area).

4) RGW Relocate

After receipt of a RAU messages indicating an old RAI that does not belong to the New MOGW, the New MOGW uses a new message defined in section 1.16.1. This message is sent from the New to the Old MOGW that is used by the New MOGW and it contains information about the mobile and its connections. It also contains information to establish a tunnel between the Old to New MOGW.

5) RGW Relocate Acknowledge

This message, if it does not contain an error code, is used by the Old MOGW to indicate to the New MOGW that it is ready to support the mobility procedure and take over packet forwarding and signalling functions for the mobile. This also identifies the successful tunnel establishment between Old and New MOGW. In case where the tunnel establishment was not possible then an Error code describing the reason is returned in this message and the Inter-MOGW procedure is aborted.

6) Packet Forwarding

When the "Tunnel Option" is used (i.e. set in tunnel mechanism field in RWG Relocate message), the Old MOGW starts tunnelling packets to the New MOGW.

7) Security Procedure (6a/6b)

8) May be performed by the New MOGW to perform Authentication and ciphering checks.

9) RGW Relocate

10) This is an optional message that is used to terminate the inter-MOGW tunnel and abort the inter-MOGW procedure in case the security procedure had failed.

11) New MOGW "Host Route" Event

If the "Host Route" option is implemented instead of the "Tunnel Option" then the New MOGW will start advertising the newly acquired host route in its routing protocol advertisements.

12) Update Location

Message used by the MOGW to update the mobile's location information in the HLR.

13) Cancel Location

Message to instruct the Old MOGW that the mobile has moved to another location in the core network.

14) Iu Release Command/Complete

Message use to perform the Iu release procedure which results in the release of the signalling connection between the MOGW and RNC and between RNC and the mobile terminal.

15) Cancel Location Ack

Message sent by the MOGW to acknowledge the receipt of message 10.

16) Insert Subscriber Data Procedure

Message used by the MOGW to obtain the subscription information for the specific mobile user 17) Update Location Ack Message used to acknowledge the Location Update message number 9.

18) Location Update Procedure to MSC/VLR

Optional message to update the location information of the mobile also in the Mobile Switching Centre (MSC) and Visiting Location register (VLR).

19) Routing Area Update Accept

Message sent by the MOGW to the mobile terminal to accept the RAU in step 2.

20) Routing Area Update Complete

Message sent by the mobile terminal to the MOGW to complete the RAU procedure.

1.16.2.4 Tunnel Termination for "Tunnel Option"

The Tunnel between Old MOGW and New MOGW will by default have an infinite lifetime. It should however be terminated when the last of the UE's PDP Contexts (using the address for which the tunnel is established) is deactivated either explicitly (i.e. PDP Context Deactivation) or implicitly (i.e. UE turned off and PDP Context times out in MOGW). In order to terminate the tunnel and allow the Old MOGW to free the address in use (i.e. to allow for its allocation to other users) it is necessary for the New MOGW to inform the Old MOGW of changes in the PDP State to INACTIVE (i.e. PDP Context Deactivated) for the UE in question. The RGW Relocate and RGW Relocate Acknowledge messages are used for this purpose.

Figure 20:
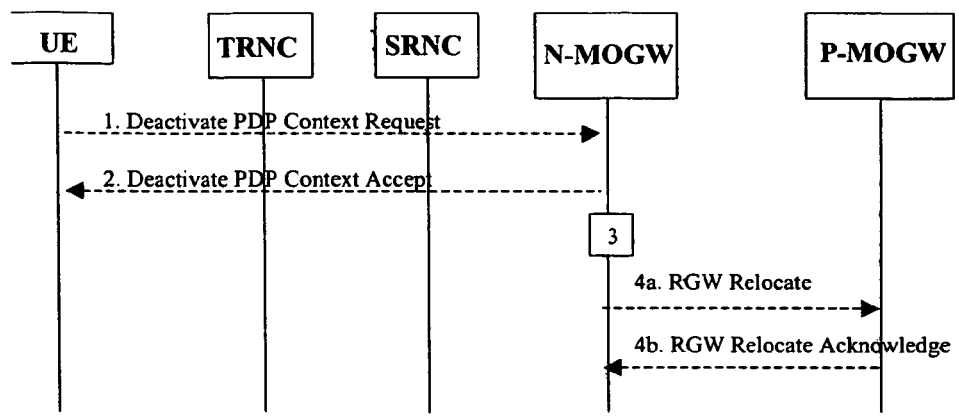
FIG. 20 illustrates the signalling message exchange to perform the Tunnel Termination procedure for "Tunnel Option" for the Simple Inter-MOGW case in accordance with exemplary embodiments of the present invention.

Following is a description of the numbered message exchanges in FIG. 20:

1) Deactivate PDP Context Request

The UE terminates the data connection and Deactivates the primary PDP Context. This may not be performed if the UE is turned off abruptly (e.g. battery removed).

2) Deactivate PDP Context Accept

The MOGW returns an accept message to the UE.

3) New MOGW Mobility Management Event

4) If message 1 is not received, the PDP Context may go to INACTIVE state if no Routing Area update is received within the appropriate time window.

5) RGW Relocate

6) This message is sent as a consequence of Message 1 or event 3. The Old MOGW terminates the tunnel when it receives this message. The message type indicates that it is a tunnel termination message and the tunnel lifetime will be zero.

7) RGW Relocate Acknowledge

This message confirms the termination of the inter-MOGW tunnel.

1.16.3 Anticipated Inter-MOGW Mobility Procedure

Figure 21:
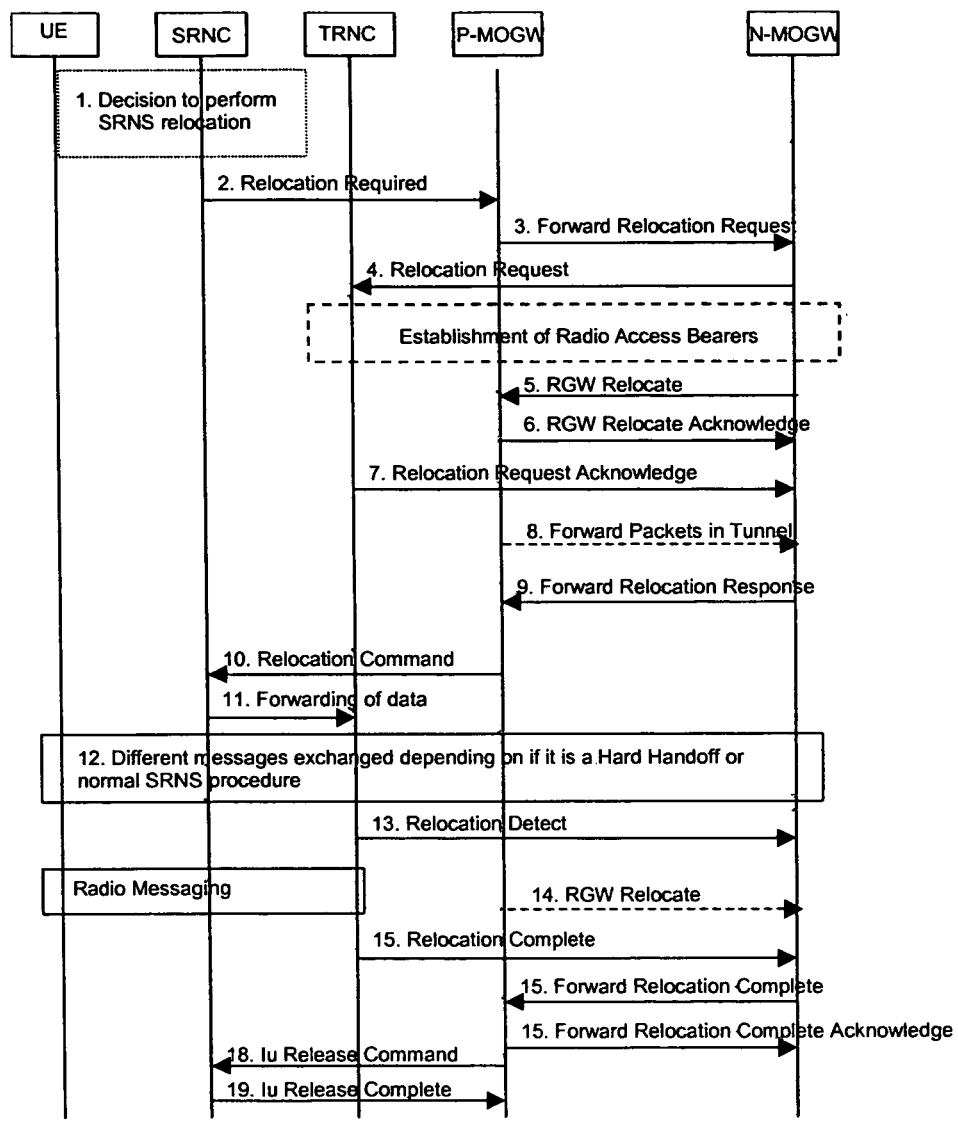
FIG. 21 illustrates the signalling exchange for the Anticipated Inter-MOGW procedure in accordance with exemplary embodiments of the present invention.

This procedure is performed if the UTRAN supports the SRNS Relocation messages and procedure. If this is not supported then the MOGW reverts to the Simple procedure described in 1.16.2. The concept is to anticipate the tunnel creation before the UE moves between P-MOGW and N-MOGW. The signalling message exchange is illustrated in FIG. 21. Following is a description of the numbered exchanges in the figure:

1) The decision is taken to perform SRNS relocation procedure by the radio network (SRNC)

2) The Relocation Required message starts off the SRNS relocation procedure

3) The Forward Relocation Request message is sent by the P-MOGW if the target identifier corresponds to another MOGW (N-MOGW). It contains the information related to the mobile and its data connections.

4) The Relocation Request message is sent by the N-MOGW to the TRNC in order to allocate Iu and RAB resources.

5) The RGW Relocate message is used by the N-MOGW to establish the bidirectional tunnel to the P-MOGW.

6) The RGW Acknowledge message acknowledge the creation of the tunnel between P-MOGW and N-MOGW.

7) The Relocation Request Acknowledge confirms that the necessary Iu and RAB resources have been established.

8) Forward Packets in Tunnel. Packets start being forwarded in the tunnel if the "Tunnel Option" is configured and supported by both P-MOGW and N-MOGW. This can be determined using the information in the RGW Relocate and Relocate Acknowledge messages which are used by the MOGWs to signal support of this option. Packets are "bicasted" or duplicated and sent both to the N-MOGW and to the S-RNC if the appropriate flag is set in the MOGW Handoff Required/Response messages.

9) The Forward Relocation Response message confirms that the N-MOGW is ready to proceed and that the TRNC is ready to receive data from the SRNC.

10) The P-MOGW continues the procedure by using the Relocation Command

11) Forwarding of Data. The SRNC starts forwarding downlink packets for the appropriate RABs to the TRNC.
12) These messages will be different messages according to the type of SRNS relocation performed as defined in 3GPP standards.
13) The Relocation Detect message is sent when the TRNC is ready to start operating as the SRNC.
14) RGW Relocate. When the N-MOGW receives this message in the "Host Route" case it can start advertising the acquired IP addresses in its routing protocols. Otherwise the message instructs the N-MOGW to terminate the tunnel to the P-MOGW.
15) Relocation Complete message is sent by the TRNC to the N-MOGW to signal the completion of the relocation procedure.
16) Forward Relocation Complete message is used by the N-MOGW to inform the P-MOGW that the relocation has been completed.
17) Forward Relocation Complete Acknowledge message confirms the receipt of the Forward Relocation Complete message.
18) Iu Release Command message is sent by the P-MOGW to release the Iu connection.
19) Iu Release Complete message confirms the release of the Iu connection.

1.17 MOGW Interworking with Legacy SGSN and GGSN Nodes

Figure 22:
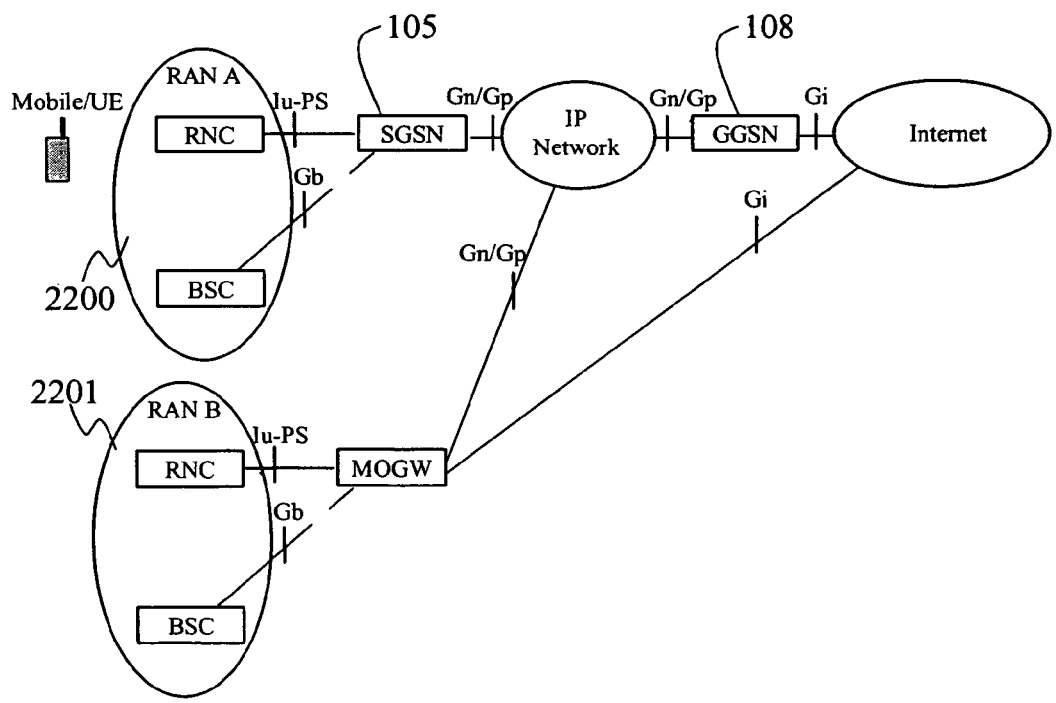
FIG. 22 illustrates a schematic of the interworking between MOGW and SGSN/GGSN nodes in accordance with exemplary embodiments of the present invention.

As illustrated in FIG. 22 the MOGW is able to function within an existing mobile core network composed of SGSN and GGSN nodes. To achieve this the MOGW is able to communicate with SGSN and GGSN nodes in terms of signalling on the Gn or Gp interface and in terms of user traffic forwarding on the Gn or Gp interface. The Gp interface is functionally the same as the Gn interface, with the difference that the Gp interface identifies communication between SGSNs and GGSNs in different operator networks. The latter is widely known as the "roaming" scenario.

When Mobile (UE) moves from a RAN A (2200) connected to SGSN 105 to a RAN B (2201) connected to a MOGW, both for the roaming and non-roaming cases, the MOGW needs to function as an SGSN. When the MOGW is receives one of the following messages it performs signalling on the Gn interface to establish or move the data connection:

receives a "SGSN Context Request" message on the Gn/Gp interface from the SGSN or receives a "Create PDP Context Request" message from the Mobile that contains an APN belonging to a GGSN or receives a RAU message over the Iu-ps from the Mobile that contains an APN belonging to a GGSN. The MOGW is able to determine whether the RAI belongs to an SGSN or MOGW by performing a lookup on the RAI table that contains a flag in its entries to identify whether it is an SGSN or MOGW RAI.

If one of the above occurs the MOGW generates a TEID value as described in section 1.6 and is able to start forwarding packets according to the forwarding functionality specified earlier.

1.18 Location-Based Service

It is well established that a trusted external entity may request the location information of a mobile user from the mobile network. However the MOGW provides more advanced services.

Figure 23:
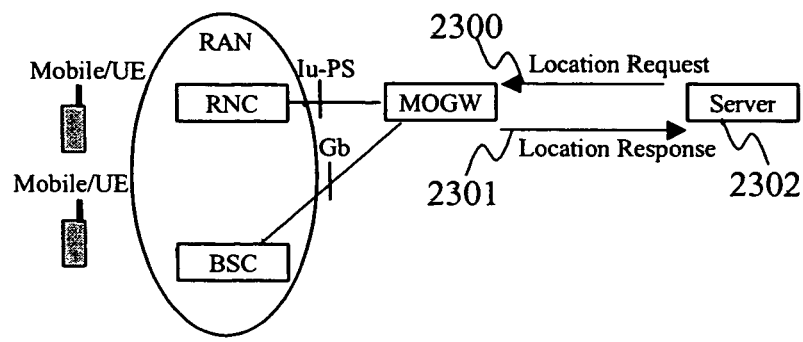
FIG. 23 illustrates a schematic of the location based communication using the MOGW in accordance with exemplary embodiments of the present invention.

Future services based on interactivity of mobile users located in the same geographical area or nearby do not always need to request the actual location of the mobile users. This makes it easier to maintain the location privacy of mobile users. As illustrated in FIG. 23, an external entity such as a Server 2302 can for example request from the MOGW whether two mobile users are located in the same geographical area. The mobile user will be identified in the Location Request (2300) by using either the Internal Mobile Subscriber Identity (IMSI) or the mobile phone number (otherwise named MSISDN). The size of the geographical area, for example in terms of the radius of a circle in hundreds of meters, may also be specified by the requesting external entity. The Server 2302 may in addition request the MOGW to inform it of any changes for a certain period of time. The MOGW answers the Location Request message 2300 using a Location Response message 2301 containing either the location information or the result of the query regarding the vicinity of two mobile users. The MOGW may also send additional spontaneous Location Response messages if requested by the Server to update it if the information in the response changes during a certain time period.

1.19 Push Service

The MOGW is able to receive and process specially formatted packets from external entities (e.g. on Internet) that need to be "pushed" to the mobile user. This may happen, for example, when the mobile user wants to receive information on commercial offers or local news relative to its current geographical location. These "push" packets are IPv4 or IPv6 packets with a special information "tag" that identifies them as special packets and contains the mobile terminal's IMSI or MSISDN. One way to implement such a tag is using an extension header in the case of Ipv.

1.20 Description of Various Embodiments of the Invention

Having described various embodiments in detail, several other embodiments are described below.

One embodiment of the invention is a method of routing data packets comprising: assigning an identifier to a wireless connection between a mobile device (UE) and a radio access network; transmitting the identifier to the radio access network; assigning a data network address to the mobile device; and providing at least one forwarding table comprising information for forwarding data packets to and from the mobile device, the information including the data network address and the identifier.

Another embodiment of the invention is a method according to the embodiment described above, further comprising: tagging a data packet with the identifier; and transmitting the data packet according to the at least one forwarding table.

Another embodiment of the invention is a method of routing data packets, in which the method comprises: tagging a data packet with an identifier assigned to a wireless connection between a mobile device and a radio access network, the identifier having been transmitted to the radio access network; and transmitting a data packet according to at least one forwarding table comprising information for forwarding data packets to and from the mobile device, the information including a data network address and the identifier.

Another embodiment of the invention is a method according to any embodiment described above, wherein the identifier is a general packet radio system (GPRS) tunnelling protocol (GTP) tunnel identifier.

Another embodiment of the invention is a method according to any embodiment described above, wherein the identifier comprises: an interface identifier which comprises a physical interface identifier and a logical interface identifier for respectively identifying a physical interface and a logical interface of a telecommunications system; and a connection identifier for identifying a wireless connection on the physical interface and logical interfaces; wherein the identifier optionally comprises: a format identifier for identifying sizes of the interface index and the connection identifier; a Quality of Service identifier for describing the quality of the wireless connection; and/or a security identifier for identifying whether the wireless connection requires ingress filtering security.

Another embodiment of the invention is a method according to any embodiment described above, wherein the data network address is an internet protocol (IP) address and the IP address is version 4 or 6, and wherein assigning the IP address comprises choosing the IP address from a set of IP addresses associated with physical and logical interfaces of the identifier.

Another embodiment of the invention is a method according to any embodiment described above, comprising: determining a number of unassigned data network addresses; and if the number of unassigned data network addresses falls below a threshold number, requesting to be provided with additional data network addresses from an address allocation server.

Another embodiment of the invention is a method according to any embodiment described above, wherein the data network address is an internet protocol (IP) address and the IP address is represented using a 64 bit value comprising the first 64 bits of an IPv6 address or 32-bits of an IPv4 address; and, optionally, the IP address further comprises an IPv6 link-local prefix, an identifier for identifying a logical interface and an IPv4 address.

Another embodiment of the invention is a method according to any embodiment described above, comprising: receiving a data packet with a tag identifying the mobile device; and forwarding the data packet using the tag; and/or receiving a data packet; adding a tag identifying the mobile device to the data packet; transmitting a data packet with a tag identifying the mobile device.

Another embodiment of the invention is a method according to the embodiment described in paragraph 9, wherein the tag is the identifier.

Another embodiment of the invention is a method according to the embodiment described in paragraphs 9 or 10, wherein the tag is included in: an IPv6 extension header of the data packet or a user datagram protocol (UDP) or transmission control protocol (TCP) packet, said tag being placed before payload of the UDP or TCP packet.

Another embodiment of the invention is a method according to any embodiment described above, wherein the forwarding table includes: the data network address, the identifier, optional information for identifying a lower layer transport for forwarding the packets, an optional security flag for identifying whether ingress filtering is to be performed on data packets, an optional secondary packet data control (PDP) context flag for identifying whether further filtering is required to determine on which wireless connection the packets are to be forwarded, an optional logical interface identifier for identifying a logical interface of a telecommunications system, optional information for describing a tunnelling mechanism to be used for forwarding the packets, and/or optional information for identifying a physical interface on which the packets are to be forwarded.

Another embodiment of the invention is a method according to any embodiment described above, wherein the at least one forwarding table comprises a set of forwarding tables comprising: a data network interface (Gi) forwarding table comprising information for forwarding packets received on a data network interface (Gi), an access point name (APN) forwarding table comprising information regarding each APN, a core network interface (Gn) forwarding table comprising information for forwarding packets received on a core network interface (Gn), an access interface to data network interface (Iu-to-Gi) forwarding table comprising information for forwarding packets received on an access interface (Iu) and destined for packet data networks (PDNs) or mobility gateways (MOGW) on the packet data network interface (Gi), an access interface to core network interface (Iu-to-Gn) forwarding table comprising information for forwarding packets received on the access interface (Iu) and destined for serving GPRS support nodes (SGSNs) or gateway GPRS support nodes (GGSNs) on the core network interface (Gn), a router advertisement forwarding table comprising information for IPv6 neighbor discovery functions, and/or an inter mobility gateway (MOGW) connection mapping table and/or inter-MOGW source IP address mapping table used for forwarding packets based on their IP source address.

Another embodiment of the invention is a method according to any embodiment described above, wherein the forwarding table includes information for forwarding packets received via a data network interface (Gi) to radio access networks (RANs), mobility gateways (MOGWs) and serving GPRS support nodes (SGSNs), and the method comprises: receiving data packets via the data network interface (Gi); and identifying which of the data packets should be forwarded to one or more of the RANs, which of the data packets should be forwarded to one or more of the MOGWs and/or which of the data packets should be forwarded to one or more of the SGSNs.

Another embodiment of the invention is a method according to any embodiment described above, wherein the forwarding table including information for forwarding packets received on an access interface (Iu) and destined for the packet data networks (PDNs) or mobility gateways (MOGWs) on the data network interface (Gi) or gateway GPRS support nodes on the core network interface (Gn), and the method comprises: receiving data packets via the access interface (Iu); and identifying which of the data packets should be forwarded to one or more PDNs, which packets should be forwarded to a gateway GPRS support node (GGSN) and which of said packets should be forwarded to one or more MOGWs.

Another embodiment of the invention is a method according to any embodiment described above, wherein the forwarding table including information for forwarding packets received on a core network interface (Gn), and the method comprises: receiving packets via the core network interface (Gn); and identifying which of said packets should be forwarded to one or more radio access networks (RANs) and which of said packets should be forwarded to one or more packet data networks (PDNs).

Another embodiment of the invention is a method according to any embodiment described above, comprising: detecting movement of the mobile device from the radio access network to a another radio access network; receiving a message from a mobility gateway associated with the other radio access network, said message comprising the identifier and a request for creation of a data packet tunnel; transmitting a message to the mobility gateway for acknowledging creation of the data packet tunnel; transmitting data packets intended for said mobile device to the mobility gateway via said data packet tunnel; and receiving data packets originating from the mobile device from the mobility gateway via said data packet tunnel.

Another embodiment of the invention is a method according to any embodiment described above, comprising: detecting movement of the mobile device to the radio access network from a another radio access network; transmitting a message to a mobility gateway associated with the other radio access network, said message comprising the identifier and a request for creation of a data packet tunnel; receiving a message from the mobility gateway for acknowledging creation of the data packet tunnel; transmitting data packets originating from the mobile device to the mobility gateway via said data packet tunnel; and receiving data packets intended for the mobile device from the mobility gateway via said data packet tunnel.

Another embodiment of the invention is a method according to any embodiment described above, comprising: detecting movement of the mobile device from the radio access network to another radio access network; transmitting a message to a mobility gateway associated with the other radio access network, said message comprising information related to the mobile device and requesting the mobility gateway to establish wireless connections for said mobile device; receiving a message from the mobility gateway, said message comprising the identifier and a request for creation of a data packet tunnel; transmitting a message to the mobility gateway for acknowledging creation of the data packet tunnel; transmitting data packets intended for said mobile device to the mobility gateway via said data packet tunnel; and receiving data packets originating from the mobile device from the mobility gateway via said data packet tunnel.

Another embodiment of the invention is a method according to any one of the embodiments described in paragraphs 205, 206 or 207, comprising: communicating with the mobility gateway using messages via a data network interface (Gi).

Another embodiment of the invention is a method according to any one of the embodiments described paragraphs 205 to 208, wherein detecting movement of the mobile device from the radio access network to another radio access network comprises the mobility gateway receiving a routing area update message and/or a serving radio network subsystem (SRNS) relocation required message.

Another embodiment of the invention is a method according to any one of the embodiments described in paragraphs 206 to 209, wherein the data packet tunnel comprises the identifier.

Another embodiment of the invention is a method according to any one of the embodiments described in paragraphs 206 to 210, wherein said message comprises: a message identifier, the identifier, information for describing the data packet tunnel; information for describing the wireless connection.

Another embodiment of the invention is a method according to any one of the embodiments described in paragraphs 206 to 211, comprising: transmitting a router advertisement including a new IPv6 prefix to the mobile device.

Another embodiment of the invention is a method according to any one of the embodiments described in paragraphs 206 to 212, comprising: receiving an instruction to terminate the data packet tunnel; and terminating the wireless connection.

Another embodiment of the invention is a method according to any one of the embodiments described in paragraphs 206 to 213, wherein the mobile device is associated with a corporate entity and the method comprises: acting as a mobile IP mobile node; sending a binding update or registration message in accordance with mobile IP protocol to a corporate function, the binding update or registration message identifying the mobile device and the corporate entity.

Another embodiment of the invention is a method according to any embodiment described above, comprising: communicating with packet switched devices in accordance with third generation universal mobile telecommunications services (UMTS) standards and GTP protocol.

Another embodiment of the invention is a method according to any embodiment described above, comprising: receiving a request from a server device regarding whether two mobile devices are located in the same geographical area; and if two mobile devices are located in the same geographical area, transmitting response which includes information relating to the geographical area of said mobile devices.

Another embodiment of the invention is a method according to any embodiment described above, comprising: identifying the mobile device using an international mobile subscriber identity (IMSI) or a mobile subscriber integrated services digital network (MSISDN) number.

Another embodiment of the invention is a method of routing data in a communications system comprising first and second mobility gateway associated with first and second radio access networks respectively, the method comprising: the first mobility gateway routing data packets according to any preceding claim; and the second mobility gateway: detecting movement of the mobile device from the first radio access network to the second radio access network; transmitting a message to the first mobility gateway, said message comprising the identifier and a request for creation of a data packet tunnel; receiving a message from the first mobility gateway for acknowledging creation of the data packet tunnel; receiving data packets intended for said mobile device from the first mobility gateway via said data packet tunnel; and transmitting data packets originating from the mobile device from the first mobility gateway via said data packet tunnel.

Another embodiment of the invention is a method of operating a first mobility gateway associated with a first radio access network, the method comprising: receiving a routing area update (RAU) message from a mobile device, the message identifying a second mobility gateway associated with a second radio access network; sending a message to the second mobility gateway, said message comprising an identifier assigned to a wireless connection between the mobile device and the second radio access network and a request for creation of a data packet tunnel; receiving data packets intended for said mobile device from the second mobility gateway via said data packet tunnel; and transmitting data packets originating from the mobile device to the second mobility gateway via said data packet tunnel.

Another embodiment of the invention is a method according to the embodiment described in paragraph 219, further comprising: determining the number of data packets transmitted and/or received falls below a predetermined threshold and, if so, transmitting an instruction to the second mobility gateway to terminate the tunnel.

Another embodiment of the invention is a computer program which when executed by a router causes the router to perform the method according to any embodiment of the invention described above.

Another embodiment of the invention is a system or router for routing data packets comprising: means for assigning an identifier to a wireless connection between a mobile device and a radio access network; means for communicating the identifier to the radio access network; means for assigning a network address to the mobile device; means for providing at least one forwarding table comprising information for forwarding data packets to and from the mobile device, the information comprising the network address and the identifier.

Another embodiment of the invention is a system or router according to the embodiment described in paragraph 222, comprising: means for tagging a data packet with the identifier; and means for transmitting the data packet according to the at least one forwarding table and the identifier; and/or means for receiving a tagged data packet; and means for processing the data packet according to the at least one forwarding table and the identifier.

Another embodiment of the invention is a system or router according to the embodiment described in paragraphs 222 or 223, comprising: an access interface (Iu) or a base station controller interface (Gb) configured to be connectable to at least one radio access networks; a data network interface (Gi) configured to be connectable to at least one packet data network; an authentication interface (Gr) configured to be connectable to at least one home location register (HLR); and an aoptional core network interface (Gn) configured to be connectable to at least one serving GPRS support node (SGSN) or gateway GPRS support node (GGSN).

Another embodiment of the invention is a system or router according to any one of the embodiments described in paragraphs 222 to 224, comprising a plurality of interface cards or blades; wherein the forwarding table is divided between and stored on one or more interface cards or blades and a controlling means for creating and updating the forwarding table is stored on another interface card.

Another embodiment of the invention is a system or router according to any one of the embodiments described in paragraphs 222 to 224, comprising: controlling means; forwarding means; internal application server means and corporate forwarding means.

Another embodiment of the invention is a system according to the embodiment described in paragraph 226, comprising a plurality of devices, wherein said a first device includes one of the means and a second, different device includes another, different means.

Another embodiment of the invention is a system or router according to any one of the embodiments described in paragraphs 222 to 227, wherein the controlling means is configured to communicate with a controller in the radio access network and the forwarding means is configured to communicate with a user traffic entity in the radio access network.

Another embodiment of the invention is a system or router according to any one of the embodiments described in paragraphs 222 to 228, wherein the controlling means is configured to receive and process signalling messages and to create and update the forwarding table.

Another embodiment of the invention is a system or router according to any one of the embodiments described in paragraphs 222 to 229, wherein the forwarding means comprise an access interface (Iu) forwarding means, a data network interface (Gi) forwarding means and core network interface (Gn) forwarding means.

Another embodiment of the invention is a device according to any one of the embodiments described in paragraphs 227 to 230, wherein said means are distributed on different interface cards or blades.

Another embodiment of the invention is a system or device according to any one of the embodiments described in paragraphs 227 to 231, wherein signaling messages conform to second and third generation mobile phone standards and may include attach, detach, routing area update, activate PDP context, deactivate PDP context, SRNS relocation and Iu release messages.

Another embodiment of the invention is a system or device according to any one of the embodiments described in paragraphs 227 to 232, wherein the controlling means is configured to request the forwarding means to inform the controlling function when the forwarding means receives data packets having a given network addresses.

Another embodiment of the invention is a system or device according to any one of the embodiments described in paragraphs 227 to 233, wherein the forwarding means is configured: to receive a data packet and to remove the identifier from the data packet and/or to insert the identifier into a data packet and to transmit the data packet.

Another embodiment of the invention is a system or device according to any one of the embodiments described in paragraphs 227 to 234, wherein: the controlling means is configured to receive a request to activate a wireless connection for a mobile device; the controlling means is configured to send a mobile IP binding update request or registration request to the corporate means, wherein the request includes a home address corresponding to an address requested by the mobile device; the corporate means is configured to assign the home address to the mobile device and to send a binding acknowledge or registration reply to the control means upon receiving the binding update request or registration request; and the system or device is configure to create a tunnel between the forwarding means and the corporate means to transmit packets to and from the mobile device.

Another embodiment of the invention is a system or device according to any one of the embodiments described in paragraphs 235, wherein the corporate means is configured to operate according to a mobile IP home agent and the control means and forwarding means are configured to operate together as a mobile IP mobile node.

Another embodiment of the invention is a system or device according to the embodiment described in paragraphs 235 or 236, wherein the binding update message comprises a corporate identifier which identifies the corporate entity with which the mobile device is affiliated, the corporate identifier usable by the corporate means to assign a home address.

Another embodiment of the invention is a system or device according to the embodiment described in paragraph 237, wherein the corporate identifier is usable as a means of distinguishing packets belonging to mobile devices affiliated to different corporate entities by using the corporate identifier in a GRE tunnel header, in an IPv6 tunnel utilizing an IPv6 option header or in an Ethernet VLAN tag.

Another embodiment of the invention is a system or device according to any one of the embodiments described in paragraphs 227 to 238, wherein the internal server means is configured to execute applications including local mobile application services and databases.

Another embodiment of the invention is a system according to any one of the embodiments described in paragraphs 222 to 239, comprising: a radio access network including a radio network controller and node B in accordance with a third generation UMTS standard.

Another embodiment of the invention is a system according to any one of the embodiments described in paragraphs 222 to 240, comprising: a radio access network including base station controller in accordance to second generation GSM standard and/or EDGE standard.

Those skilled in the art will recognize that the method and system of the present invention has many applications, may be implemented in many manners and, as such, is not to be limited by the foregoing illustrative embodiments and examples. In this regard, any number of the features of the different embodiments described herein may be combined into one single embodiment. Moreover, the scope of the present invention covers conventionally known and future developed variations and modifications to the system components (e.g., hardware, software, programming languages, communication networks, etc.) described herein, as would be understood by those skilled in the art.

The invention claimed is:

1. A gateway node for routing data packets between a packet data network and a mobile device in a radio access network, the gateway node comprising:
one or more physical interfaces
for communicating data to and from the packet data network using a Gi interface, and
for communicating data to and from the radio access network using a radio access network interface;
means for assigning an identifier to a wireless connection between the mobile device and the radio access network, wherein the identifier comprises:
an interface identifier, wherein the interface identifier includes:
a physical interface identifier that identifies a physical interface from the one or more physical interfaces, wherein the physical interface is used to communicate data packets to and from the packet data network using the Gi interface; and
a logical interface identifier that identifies a logical interface that is used to communicate data packets to and from the packet data network using the Gi interface; and
a connection identifier that identifies a wireless connection for the mobile device that is associated with the physical interface and the logical interface;
means for communicating the identifier to the radio access network;
means for assigning a network address to the mobile device; and
means for storing at least one forwarding table, wherein the forwarding table includes the network address and the identifier; and
means for forwarding data packets between the mobile device and the packet data network based on the network address and the identifier, wherein the forwarding is performed using the Gi interface and the radio access network interface; and
the gateway node further comprising:
means for tagging a data packet with the identifier; and
means for transmitting the data packet according to the at least one forwarding table and the identifier; and/or
means for receiving a tagged data packet; and
means for processing the data packet according to the at least one forwarding table and the identifier.

2. The gateway node according to claim 1 wherein said gateway node is a router.

3. The gateway node according to claim 1, wherein:
the one or more physical interfaces are configured to communicate with a home location register (HLR) using an authentication interface (Gr).

4. The gateway node according to claim 1, further comprising;
a plurality of interface cards or blades;
wherein the forwarding table is divided between and stored on one or more interface cards or blades and a controlling means for creating and updating the forwarding table is stored on another interface card.

5. The gateway node according to claim 1, further comprising:
controlling means for creating and updating the forwarding table;
internal application server means for running applications accessible to mobile devices; and
corporate forwarding means for forwarding packets for corporate networks.

6. The gateway node according to claim 5, further comprising a plurality of devices, wherein a first device of the devices includes one of the controlling means, internal application server means or corporate forwarding means, and a second device of the devices, different from the first device by including a different one of the controlling means, internal application server means or corporate forwarding means.

7. The gateway node according to claim 1, further comprising a controlling means for communicating with a controller in the radio access network, wherein the forwarding means is configured to communicate with a user traffic entity in the radio access network.

8. The gateway node according to claim 1, further comprising a controlling means that is configured to receive and process signalling messages and to create and update the forwarding table.

9. The gateway node according to claim 1, wherein the forwarding means comprise an access interface (Iu) forwarding means and a data network interface (Gi) forwarding means.

10. The gateway node according to claim 6, wherein the controlling means, internal application server means or corporate forwarding means are distributed on different interface cards or blades.

11. The gateway node according to claim 6, wherein signaling messages conform to second and third generation mobile phone standards and include one or more of the following messages: attach, detach, routing area update, activate PDP context, deactivate PDP context, SRNS relocation and Iu release messages.

12. The gateway node according to claim 6, wherein the controlling means is configured to request the forwarding means to inform the controlling means when the forwarding means receives data packets having a given network addresses.

13. The gateway node according to claim 6, wherein the forwarding means is configured:
to receive a data packet and to remove the identifier from the data packet and/or
to insert the identifier into a data packet and to transmit the data packet.

14. The gateway node according to claim 6, wherein:
the controlling means is configured to receive a request to activate a wireless connection for a mobile device;
the controlling means is configured to send a mobile IP binding update request or registration request to the corporate forwarding means, wherein the request includes a home address corresponding to an address requested by the mobile device;
the corporate forwarding means is configured to assign the home address to the mobile device and to send a binding acknowledge or registration reply to the controlling means upon receiving the binding update request or registration request; and
the system is configured to create a tunnel between the forwarding means and the corporate forwarding means to transmit packets to and from the mobile device.

15. The gateway node according to claim 14, wherein the corporate forwarding means is configured to operates according to a mobile IP home agent and the controlling means and forwarding means are configured to operate together as a mobile IP mobile node.

16. The gateway node according to claim 14, wherein the mobile IP binding update message comprises a corporate identifier which identifies the corporate entity with which the mobile device is affiliated, the corporate identifier usable by the corporate forwarding means to assign a home address.

17. The gateway node according to claim 16, wherein the corporate identifier is usable as a means of distinguishing packets belonging to mobile devices affiliated to different corporate entities by using the corporate identifier in a GRE tunnel header, in an IPv6 tunnel utilizing an IPv6 option header or in an Ethernet VLAN tag.

18. The gateway node according to claim 6, wherein the internal server means is configured to execute applications including local mobile application services and databases.

19. The gateway node according to claim 1, wherein the radio access network includes a radio network controller and node B in accordance with a third generation UMTS standard.

20. The gateway node according to claim 1, wherein the radio access network includes a base station controller in accordance to second generation GSM standard and/or EDGE standard.

21. The gateway node according to claim 1, wherein the radio access network interface is an Iu interface.

22. The gateway node according to claim 1, wherein the radio access network interface is a Gb interface.

23. A system, comprising:
a first gateway node for routing data packets between a packet data network and a mobile device in a first radio access network, the first gateway node comprising:
  one or more physical interfaces
    for communicating data to and from the packet data network using a Gi interface, and
    for communicating data to and from the first radio access network using a radio access network interface;
  means for assigning an identifier to a wireless connection between the mobile device and the first radio access network, wherein the identifier comprises:
    an interface identifier, wherein the interface identifier includes:
      a physical interface identifier that identifies a physical interface from the one or more physical interfaces, wherein the physical interface is used to communicate data packets to and from the packet data network using the Gi interface; and
      a logical interface identifier that identifies a logical interface that is used to communicate data packets to and from the packet data network using the Gi interface; and
    a connection identifier that identifies a wireless connection for the mobile device that is associated with the physical interface and the logical interface;
  means for communicating the identifier to the first radio access network;
  means for assigning a network address to the mobile device; and
  means for storing at least one forwarding table, wherein the forwarding table includes the network address and the identifier; and
  means for forwarding data packets between the mobile device and the packet data network based on the network address and the identifier, wherein the forwarding is performed using the Gi interface and the radio access network interface; and
a second gateway node that is associated with a second radio access network, wherein the second gateway node includes:
  means to detect movement of the mobile device from the first radio access network to the second radio access network;
  means to transmit a message to the first gateway node, the message comprising the identifier and a request for creation of a data packet tunnel;
  means to receive a message from the first gateway node for acknowledging creation of the data packet tunnel;
  means to receive data packets intended for the mobile device from the first gateway node via the data packet tunnel; and
  means to transmit data packets originating from the mobile device to the first gateway node via the data packet tunnel.

* * * * *